(12) United States Patent
Yang et al.

(10) Patent No.: US 12,349,121 B2
(45) Date of Patent: Jul. 1, 2025

(54) METHODS AND APPARATUS FOR SUPPORT OF DATA TRANSMISSION TRAFFIC WITH NON-INTEGER PERIODICITY IN WIRELESS COMMUNICATION

(71) Applicant: Apple Inc., Cupertino, CA (US)

(72) Inventors: Weidong Yang, Cupertino, CA (US); Chunhai Yao, Beijing (CN); Chunxuan Ye, Cupertino, CA (US); Dawei Zhang, Cupertino, CA (US); Fangli Xu, Cupertino, CA (US); Haijing Hu, Cupertino, CA (US); Oghenekome Oteri, Cupertino, CA (US); Haitong Sun, Cupertino, CA (US); Hong He, Cupertino, CA (US); Huaning Niu, Cupertino, CA (US); Sarma V. Vangala, Cupertino, CA (US); Seyed Ali Akbar Fakoorian, Cupertino, CA (US); Sigen Ye, Cupertino, CA (US); Wei Zeng, Cupertino, CA (US); Yushu Zhang, Cupertino, CA (US)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 17/598,246

(22) PCT Filed: Oct. 23, 2020

(86) PCT No.: PCT/CN2020/123278
§ 371 (c)(1),
(2) Date: Oct. 14, 2021

(87) PCT Pub. No.: WO2022/082738
PCT Pub. Date: Apr. 28, 2022

(65) Prior Publication Data
US 2023/0007673 A1    Jan. 5, 2023

(51) Int. Cl.
*H04W 4/00* (2018.01)
*H04W 72/1263* (2023.01)
(Continued)

(52) U.S. Cl.
CPC ....... *H04W 72/1263* (2013.01); *H04W 72/23* (2023.01); *H04W 72/54* (2023.01)

(58) Field of Classification Search
CPC ... H04W 28/04; H04W 72/04; H04W 72/042; H04W 88/08; H04W 28/08;
(Continued)

(56) References Cited

U.S. PATENT DOCUMENTS 10,965,434 B1 *   3/2021   Babaei .................... H04L 5/001
11,690,048 B2 *   6/2023   Farag .................... H04L 1/1671
                                                              370/312
(Continued)

FOREIGN PATENT DOCUMENTS

CN    104919879 A    9/2015
CN    111247766 A    6/2020
(Continued)

OTHER PUBLICATIONS

European Search Report and Search Opinion received for European Application No. 20958320.2, mailed on Apr. 2, 2024, 8 pages.
(Continued)

*Primary Examiner* — Phuongchau Ba Nguyen
(74) *Attorney, Agent, or Firm* — Kubota & Basol LLP

(57) ABSTRACT

A method and apparatus of a device that determines an occurrence of the DL SPS or the UL CG to determine a periodicity of a packet generation is described. In an exemplary embodiment, the method receives a configuration for a downlink (DL) Semi-Persistent Scheduling (SPS) or an uplink (UL) Configured Grant (CG). The configuration includes an indication of non-integer periodicity of the DL
(Continued)

SPS or the UL CG. Additionally, the method determines an occurrence of the DL SPS or the UL CG based on the received configuration for the DL SPS or the UL CG to determine a periodicity of a packet generation. Thereafter, the method transmits or receives data based on the configuration for the DL SPS or the UL CG.

15 Claims, 16 Drawing Sheets

(51) Int. Cl.
*H04W 72/23* (2023.01)
*H04W 72/54* (2023.01)

(58) Field of Classification Search
CPC ... H04W 28/084; H04W 36/22; H04W 72/12; H04W 72/1263; H04W 72/23; H04W 72/54; H04W 72/0446; H04L 5/0007
See application file for complete search history.

(56) References Cited

U.S. PATENT DOCUMENTS

| | | | |
|---|---|---|---|
| 2014/0198699 A1 | 7/2014 | Makharia et al. | |
| 2020/0092908 A1* | 3/2020 | Li | H04W 72/0446 |
| 2020/0213981 A1* | 7/2020 | Park | H04W 72/23 |
| 2020/0229055 A1 | 7/2020 | Chien | |
| 2021/0250973 A1* | 8/2021 | Miao | H04L 5/0091 |
| 2022/0046639 A1* | 2/2022 | Dong | H04L 5/1469 |
| 2022/0124795 A1* | 4/2022 | Wu | H04B 7/18563 |
| 2022/0173844 A1* | 6/2022 | Lee | H04L 1/188 |
| 2022/0312472 A1* | 9/2022 | Lee | H04W 74/002 |
| 2023/0041764 A1* | 2/2023 | Park | H04L 1/1812 |
| 2023/0121856 A1* | 4/2023 | Cao | H04W 56/0065 370/329 |
| 2023/0199745 A1* | 6/2023 | Xu | H04W 72/0446 370/329 |

FOREIGN PATENT DOCUMENTS

| | | | | |
|---|---|---|---|---|
| WO | 2018/081597 A1 | 5/2018 | | |
| WO | WO-2020060805 A1 * | 3/2020 | | H04L 41/08 |
| WO | 2020/064215 A1 | 4/2020 | | |
| WO | 2020/155149 A1 | 8/2020 | | |

OTHER PUBLICATIONS

International Preliminary Report on Patentability received for PCT Patent Application No. PCT/CN2020/123278, mailed on May 4, 2023, 5 pages.
International Search Report and Written Opinion received for PCT Patent Application No. PCT/CN2020/123278, mailed on Jul. 12, 2021, 6 pages.
Nokia et al., "Support for TSC message periodicities of non-integer multiple of NR CG/SPS periodicities", 3GPP TSG-RAN WG2 Meeting #106, Reno, USA, R2-1907198, May 13, 2019, pp. 513-517.
ZTE, "Discussion on TSC message periodicity", 3GPP TSG RAN WG1 #96bis, Xi'an, China, R1-1904151, Apr. 8-12, 2019, 3 pages.
Second Office Action for Chinese Application No. 202080106517.2 dated Dec. 11, 2024 (English translation + Original document) (6 pages).
Office Action received for Chinese Patent Application No. 202080106517.2 dated Jun. 26, 2024 (13 pages) (8 pages of English Translation and 5 pages of Original Document).

* cited by examiner

METHODS AND APPARATUS FOR SUPPORT OF DATA TRANSMISSION TRAFFIC WITH NON-INTEGER PERIODICITY IN WIRELESS COMMUNICATION

CROSS-REFERENCE TO RELATED APPLICATIONS

This application claims priority to PCT/CN2020/123278 filed on Oct. 23, 2020, the contents of which are hereby incorporated by reference in its entirety.

FIELD OF INVENTION

This invention relates generally to wireless technology and more particularly to a Semi-Persistent Scheduling (SPS) and Configured Grant (CG) to support data transmission traffic.

BACKGROUND OF THE INVENTION

As traffic of large data applications are often periodic, downlink (DL) SPS and uplink (UL) CG can be considered to accommodate such traffic. The Rel-16 NR design has some limitations. For example, the supported periodicity for DL SPS in Rel-16 NR: $\{1, \ldots, 640\}$ milliseconds for a Near Radio (NR) system at 15 KHz subcarrier spacing, and $\{\frac{1}{2}, 1, 3/2, \ldots, 640\}$ milliseconds at 30 KHz subcarrier spacing, etc. The supported periodicities for the UL CG in the Rel-16 NR can include multiple of 1 millisecond for 15 KHz up to 640 milliseconds, 2 symbols ($\frac{1}{7}$ milliseconds), 7 symbols (0.5 milliseconds) and multiple of $\frac{1}{2}$ millisecond for 30 KHz up to 640 milliseconds, 2 symbols ($\frac{1}{14}$ milliseconds), 7 symbols (0.25 milliseconds).

In Industrial Internet of Things (IIoT), traffic can be generated with a frequency of 1200 Hz (i.e. 1200 packets/second). As the traffic generation may be from an installed system with decades of use, it can be difficult to modify the traffic generation periodicity to match NR timing (e.g., 100 Hz). For Augmented Reality (AR) or Virtual Reality (VR) applications, service, audio, and video streams can be generated at cadences which are not integer multiples of the NR basic timing (e.g., video stream generation at 60 or 120 frames per seconds). The existing solution in NR to address the problem is to use over-provision.

However, with the current NR solution (i.e., overprovisioning), a number of problems can be identified. Using the DL SPS as an example, even though the network does not send any traffic to the user equipment (UE) at some occasions (e.g., occasions from SPS1/SPS2/SPS3 not overlapping with the actual TSN traffic (e.g., see blocks A in FIG. 6), the UE may not have information that the network does not send such traffic. As a result, the UE may perform unnecessary channel estimation on the Demodulation Reference Signal (DMRS) symbols and/or check the calculated log-likelihood ratios (LLRs) to determine whether there is an actual transmission from the network or not. In other words, UE power consumption can be significant due to the DL processing to determine the presence of an actual transmission or not. In addition, the UE needs to generate Hybrid Automatic Repeat Request (HARD) feedback and transmit over the configured Physical Uplink Control Channel (PUCCH) resource for the transmission occurrence that is not associated with any actual transmission. This process can incur unnecessary UE power consumption. In terms of system operations, it is wasteful for the UE to send unnecessary feedback over the PUCCH, which can consume system resources and lead to UL interference.

Thus, there is a need for an enhanced mechanism for the UE and the base station (BS) that takes into account at least some of the issues discussed above, as well as other possible issues.

SUMMARY OF THE DESCRIPTION

A method and apparatus that can support data transmission traffic with non-integer periodicity in wireless communication is described.

In one aspect of the disclosure, embodiments of the present disclosure provide a baseband processor configured to perform the processes as described below. In some embodiments, a baseband processor of a wireless user equipment (UE) can be configured to perform operations. The baseband processor may receive a configuration for a downlink (DL) Semi-Persistent Scheduling (SPS) or an uplink (UL) Configured Grant (CG). The configuration may include an indication of non-integer periodicity of the DL SPS or the UL CG. Additionally, the baseband processor may determine an occurrence of the DL SPS or the UL CG based on the received configuration for the DL SPS or the UL CG to determine a periodicity of a packet generation. Further, the baseband processor may transmit or receive data based on the configuration for the DL SPS or the UL CG.

In some embodiments, the indication of non-integer periodicity of the DL SPS or the UL CG can further include a first positive integer and a second positive integer indicating periodicity of the DL SPS and the UL CG. The operations to determine the occurrence of the DL SPS or the UL CG can include rounding a term including a ratio of the first positive integer and the second positive integer using a predefined rounding function. The predefined rounding function includes a round, a ceiling, or a floor operation.

In some embodiments, the indication of non-integer periodicity of the DL SPS or the UL CG can further include an indication to a frequency of the DL SPS or the UL CG. The configuration can further include an initial offset in slots or symbols. The initial offset in slots or symbols may be associated with a slot index of a slot or a symbol in which an initial DL SPS or UL CG appears.

In some embodiments, the occurrence of the DL SPS or the UL CG can be further determined based on a System Frame Number (SFN) of a first reception of a Physical Downlink Shared Channel (PDSCH) through DL SPS or a first transmission of Physical Uplink Shared Channel (PUSCH) through UL CG and a start time of a slot of the first reception of the PDSCH or the first transmission of the PDSCH. In some other embodiments, the occurrence of the DL SPS or the UL CG can be further determined based on a number of slots in a frame.

In some embodiments, the occurrence of the DL SPS or the UL CG can be further determined based on a number of symbols per slot and a start time of a symbol of the first reception of the PDSCH or the first transmission of the PUSCH. The occurrence of the UL CG can be further determined based on a time reference of the SFN, and a time domain offset. The UL CG is a type 1.

In some embodiments, the occurrence of the DL SPS or the UL CG can be further determined based on a hyperframe index. The hyperframe index can be determined based on the first positive and second positive integers. The occurrence of the DL SPS can be further determined based on the number of symbols per slot.

In some embodiments, the operations to determine the occurrence of the DL SPS or the UL CG can further include receiving a jitter window parameter defining a jitter window around a nominal traffic arrival time. A reception occasion can occur within the jitter window. The nominal traffic time can be determined based on a running index and the first and second positive integers.

In some embodiments, the reception occasion can be expanded on one side or both sides of the reception occasion to include symbols not considered by any of the reception occasion. The symbols may include gap symbols between reception occasions, trailing symbols, or preceding symbols for a reception occasion. A reference reception occasion can indicate a nominal reception occasion in which the nominal traffic arrival time appears. The jitter window can be determined based on the jitter window parameter and the reference reception occasion.

In some embodiments, the jitter window parameter can be received via a Downlink Control Information (DCI), a Medium Access Control (MAC) Control Element (CE) or an RRC signaling. of the DL SPS or the UL CG can further include receiving data scheduled through DL SPS or transmitting data through U CG in a window defined by the jitter window.

In another aspect of the disclosure, embodiments of the present disclosure also provide a UE configured to perform the processes as described above.

In a further aspect of the disclosure, embodiments of the present disclosure also provide a base station configured to perform the processes as described above.

BRIEF DESCRIPTION OF THE DRAWINGS

The present invention is illustrated by way of example and not limitation in the figures of the accompanying drawings in which like references indicate similar elements.

DETAILED DESCRIPTION

Figure 1:
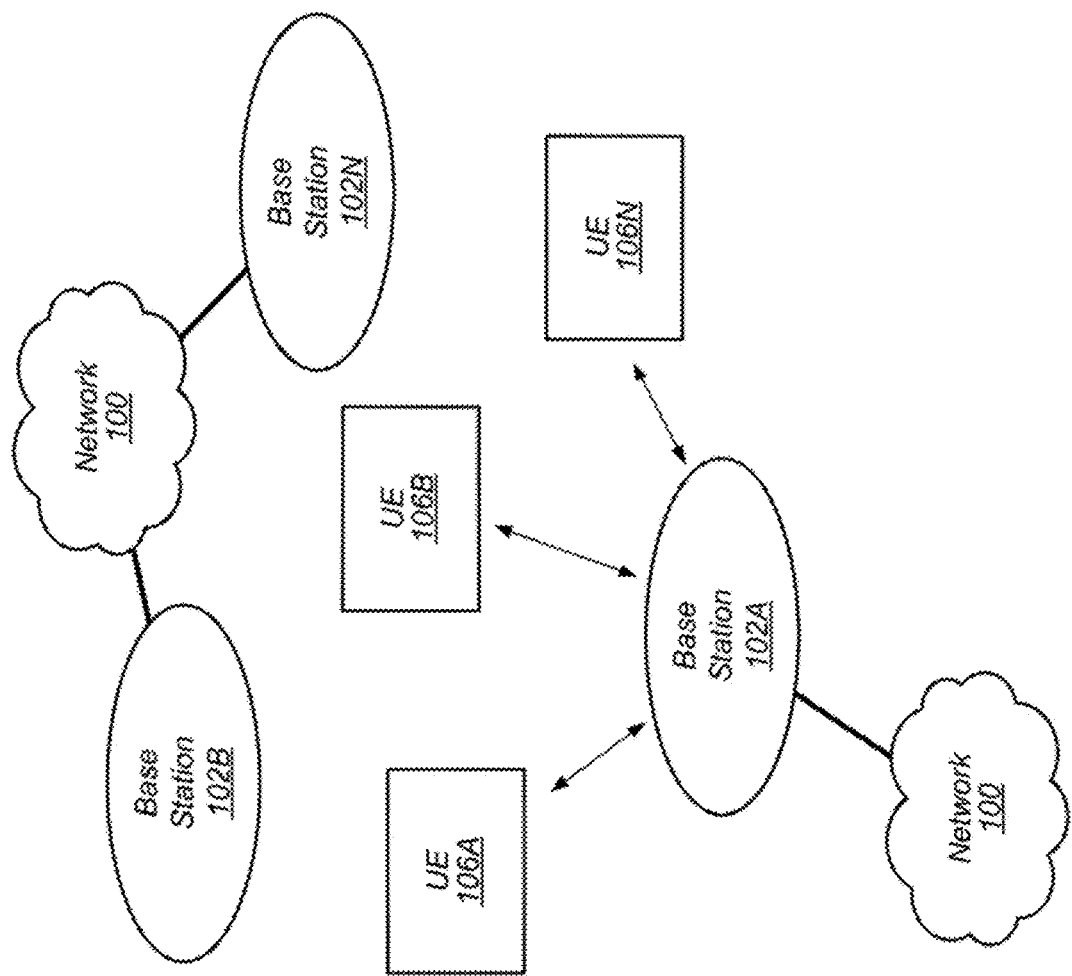
FIG. 1 illustrates an example wireless communication system according to some embodiments.

A method and apparatus of a device for use in wireless communication is described. The embodiments of method and apparatus of device determine the periodicity of the configuration of the DL SPS or the UL CG that can be used to support traffic with non-integer periodicity. The periodicity of traffic can be represented as a fraction of two integers to match the DL SPS configurations and the actual traffic profile. Additionally, rounding, ceiling or floor function can be applied to the term involving "periodicity". Further, a filtering window or a jitter window is implemented herein to reduce UE power consumption and reduce PUCCH feedback for SPS HARQ. Presented herein also a modified DL SPS configuration to reduce HARQ feedback overhead. When implemented, these embodiments of method and apparatus of device described herein can reduce UE power consumption and reduce PUCCH feedback for SPS HARQ.

In the following description, numerous specific details are set forth to provide thorough explanation of embodiments of the present invention. It will be apparent, however, to one skilled in the art, that embodiments of the present invention may be practiced without these specific details. In other instances, well-known components, structures, and techniques have not been shown in detail in order not to obscure the understanding of this description.

Reference in the specification to "some embodiments" or "an embodiment" means that a particular feature, structure, or characteristic described in connection with the embodiment can be included in at least one embodiment of the invention. The appearances of the phrase "in some embodiments" in various places in the specification do not necessarily all refer to the same embodiment.

In the following description and claims, the terms "coupled" and "connected," along with their derivatives, may be used. It should be understood that these terms are not intended as synonyms for each other. "Coupled" is used to indicate that two or more elements, which may or may not be in direct physical or electrical contact with each other, co-operate or interact with each other. "Connected" is used to indicate the establishment of communication between two or more elements that are coupled with each other.

The processes depicted in the figures that follow, are performed by processing logic that comprises hardware (e.g., circuitry, dedicated logic, etc.), software (such as is run on a general-purpose computer system or a dedicated machine), or a combination of both. Although the processes are described below in terms of some sequential operations, it should be appreciated that some of the operations described may be performed in different order. Moreover, some operations may be performed in parallel rather than sequentially.

The terms "server," "client," and "device" are intended to refer generally to data processing systems rather than specifically to a particular form factor for the server, client, and/or device.

A method and apparatus of a device that determines an occurrence of the DL SPS or the UL CG to determine a periodicity of a packet generation. In an exemplary embodiment, the method receives a configuration for a downlink (DL) Semi-Persistent Scheduling (SPS) or an uplink (UL) Configured Grant (CG). The configuration includes an indication of non-integer periodicity of the DL SPS or the UL CG. The method determines an occurrence of the DL SPS or the UL CG based on the received configuration for the DL SPS or the UL CG to determine a periodicity of a packet generation. Thereafter, the method transmits or receives data based on the configuration for the DL SPS or the UL CG.

FIG. 1 illustrates a simplified example wireless communication system, according to some embodiments. It is noted that the system of FIG. 1 is merely one example of a possible system, and that features of this disclosure may be implemented in any of various systems, as desired.

As shown, the example wireless communication system includes a base station 102A which communicates over a transmission medium with one or more user devices 106A, 106B, etc., through 106N. Each of the user devices may be referred to herein as a "user equipment" (UE). Thus, the user devices 106 are referred to as UEs or UE devices.

The base station (BS) 102A may be a base transceiver station (BTS) or cell site (a "cellular base station") and may include hardware that enables wireless communication with the UEs 106A through 106N.

The communication area (or coverage area) of the base station may be referred to as a "cell." The base station 102A and the UEs 106 may be configured to communicate over the transmission medium using any of various radio access technologies (RATs), also referred to as wireless communication technologies, or telecommunication standards, such as GSM, UMTS (associated with, for example, WCDMA or TD-SCDMA air interfaces), LTE, LTE-Advanced (LTE-A), 5G new radio (5G NR), HSPA, 3GPP2 CDMA2000 (e.g., 1×RTT, 1×EV-DO, HRPD, eHRPD), etc. Note that if the base station 102A is implemented in the context of LTE, it may alternately be referred to as an eNodeB' or 'eNB'. Note that if the base station 102A is implemented in the context of 5G NR, it may alternately be referred to as 'gNodeB' or 'gNB'.

As shown, the base station 102A may also be equipped to communicate with a network 100 (e.g., a core network of a cellular service provider, a telecommunication network such as a public switched telephone network (PSTN), and/or the Internet, among various possibilities). Thus, the base station 102A may facilitate communication between the user devices and/or between the user devices and the network 100. In particular, the cellular base station 102A may provide UEs 106 with various telecommunication capabilities, such as voice, SMS and/or data services.

Base station 102A and other similar base stations (such as base stations 102B . . . 102N) operating according to the same or a different cellular communication standard may thus be provided as a network of cells, which may provide continuous or nearly continuous overlapping service to UEs 106A-N and similar devices over a geographic area via one or more cellular communication standards.

Thus, while base station 102A may act as a "serving cell" for UEs 106A-N as illustrated in FIG. 1, each UE 106 may also be capable of receiving signals from (and possibly within communication range of) one or more other cells (which might be provided by base stations 102B-N and/or any other base stations), which may be referred to as "neighboring cells". Such cells may also be capable of facilitating communication between user devices and/or between user devices and the network 100. Such cells may include "macro" cells, "micro" cells, "pico" cells, and/or cells which provide any of various other granularities of service area size. For example, base stations 102A-B illustrated in FIG. 1 might be macro cells, while base station 102N might be a micro cell. Other configurations are also possible.

In some embodiments, base station 102A may be a next generation base station, e.g., a 5G New Radio (5G NR) base station, or "gNB". In some embodiments, a gNB may be connected to a legacy evolved packet core (EPC) network and/or to a NR core (NRC) network. In addition, a gNB cell may include one or more transition and reception points (TRPs). In addition, a UE capable of operating according to 5G NR may be connected to one or more TRPs within one or more gNBs.

Note that a UE 106 may be capable of communicating using multiple wireless communication standards. For example, the UE 106 may be configured to communicate using a wireless networking (e.g., Wi-Fi) and/or peer-to-peer wireless communication protocol (e.g., Bluetooth, Wi-Fi peer-to-peer, etc.) in addition to at least one cellular communication protocol (e.g., GSM, UMTS (associated with, for example, WCDMA or TD-SCDMA air interfaces), LTE, LTE-A, 5G NR, HSPA, 3GPP2 CDMA2000 (e.g., 1×RTT, 1×EV-DO, HRPD, eHRPD), etc.). The UE 106 may also or alternatively be configured to communicate using one or more global navigational satellite systems (GNSS, e.g., GPS or GLONASS), one or more mobile television broadcasting standards (e.g., ATSC-M/H or DVB-H), and/or any other wireless communication protocol, if desired. Other combinations of wireless communication standards (including more than two wireless communication standards) are also possible.

Figure 2:
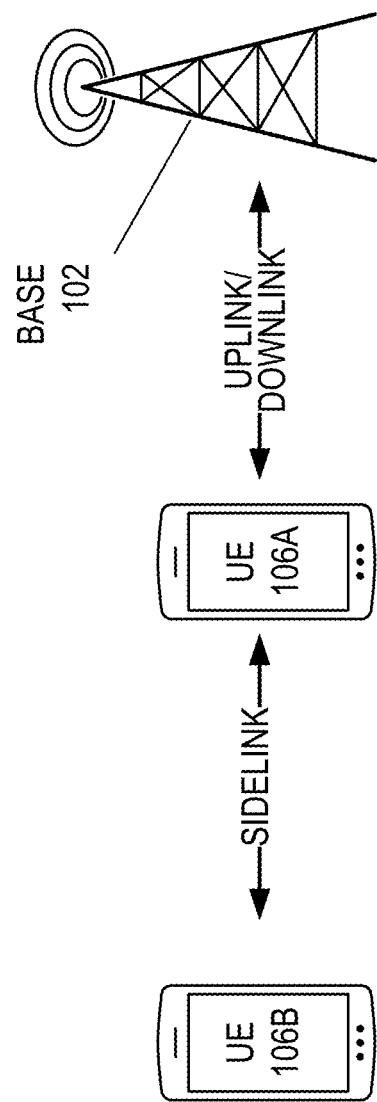
FIG. 2 illustrates a base station (BS) in communication with a plurality of user equipment (UE) device, according to some embodiments.

FIG. 2 illustrates user equipment 106A and 106B that can be in direct communication with each other (also known as device to device or sidelink). Sidelink communication can utilize dedicated sidelink channels and sidelink protocols to facilitate communication directly between devices. For example, physical sidelink control channel (PSCCH) can be used for actual data transmission between the devices, physical sidelink shared channel (PSSCH) can be used for conveying sidelink control information (SCI), physical sidelink feedback channel (PSFCH) can be used for HARQ feedback information, and physical sidelink broadcast channel (PSBCH) can be used for synchronization. Additional details are discussed in other sections.

In addition, sidelink communications can be used for communications between vehicles to vehicles (V2V), vehicle to infrastructure (V2I), vehicle to people (V2P), vehicle to network (V2N), and other types of direct communications.

UE 106A can also be in communication with a base station 102 in through uplink and downlink communications, according to some embodiments. The UEs may each be a device with cellular communication capability such as a mobile phone, a hand-held device, a computer or a tablet, or virtually any type of wireless device. The UEs 106A-B may include a processor that is configured to execute program instructions stored in memory. The UEs 106A-B may perform any of the method embodiments described herein by executing such stored instructions. Alternatively, or in addition, the UEs 106A-B may include a programmable hardware element such as an FPGA (field-programmable gate array) that is configured to perform any of the method embodiments described herein, or any portion of any of the method embodiments described herein.

The UEs 106A-B may include one or more antennas for communicating using one or more wireless communication protocols or technologies. In some embodiments, the UEs 106A-B may be configured to communicate using, for example, CDMA2000 (1×RTT/1×EV-DO/HRPD/eHRPD) or LTE using a single shared radio and/or GSM or LTE using the single shared radio. The shared radio may couple to a single antenna, or may couple to multiple antennas (e.g., for MIMO) for performing wireless communications. In general, a radio may include any combination of a baseband processor, analog RF signal processing circuitry (e.g., including filters, mixers, oscillators, amplifiers, etc.), or digital processing circuitry (e.g., for digital modulation as well as other digital processing). Similarly, the radio may implement one or more receive and transmit chains using the aforementioned hardware. For example, the UEs 106A-B may share one or more parts of a receive and/or transmit chain between multiple wireless communication technologies, such as those discussed above.

In some embodiments, the UEs 106A-B may include separate transmit and/or receive chains (e.g., including separate antennas and other radio components) for each wireless communication protocol with which it is configured to communicate. As a further possibility, the UEs 106A-B may include one or more radios which are shared between multiple wireless communication protocols, and one or more radios which are used exclusively by a single wireless communication protocol. For example, the UE 106A-B might include a shared radio for communicating using either of LTE or 5G NR (or LTE or 1×RTT or LTE or GSM), and separate radios for communicating using each of Wi-Fi and Bluetooth. Other configurations are also possible.

Figure 3:
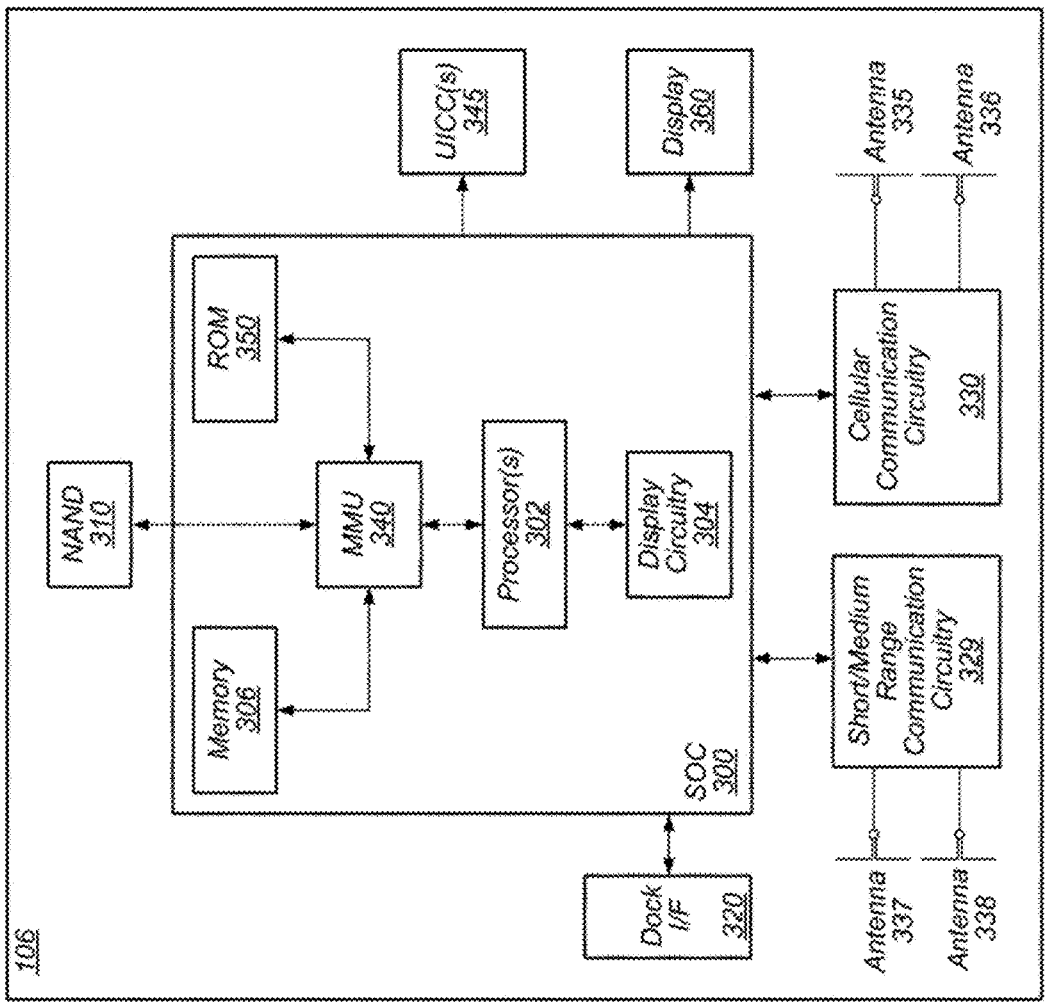
FIG. 3 illustrates an example block diagram of a UE, according to some embodiments.

FIG. 3 illustrates an example simplified block diagram of a communication device 106, according to some embodiments. It is noted that the block diagram of the communication device of FIG. 3 is only one example of a possible communication device. According to embodiments, communication device 106 may be a user equipment (UE) device, a mobile device or mobile station, a wireless device or wireless station, a desktop computer or computing device, a mobile computing device (e.g., a laptop, notebook, or portable computing device), a tablet and/or a combination of devices, among other devices. As shown, the communication device 106 may include a set of components 300 configured to perform core functions. For example, this set of components may be implemented as a system on chip (SOC), which may include portions for various purposes. Alternatively, this set of components 300 may be implemented as separate components or groups of components for the various purposes. The set of components 300 may be coupled (e.g., communicatively; directly or indirectly) to various other circuits of the communication device 106.

For example, the communication device 106 may include various types of memory (e.g., including NAND flash 310), an input/output interface such as connector I/F 320 (e.g., for connecting to a computer system; dock; charging station; input devices, such as a microphone, camera, keyboard; output devices, such as speakers; etc.), the display 360, which may be integrated with or external to the communication device 106, and cellular communication circuitry 330 such as for 5G NR, LTE, GSM, etc., and short to medium range wireless communication circuitry 329 (e.g., Bluetooth™ and WLAN circuitry). In some embodiments, communication device 106 may include wired communication circuitry (not shown), such as a network interface card, e.g., for Ethernet.

The cellular communication circuitry 330 may couple (e.g., communicatively; directly or indirectly) to one or more antennas, such as antennas 335 and 336 as shown. The short to medium range wireless communication circuitry 329 may also couple (e.g., communicatively; directly or indirectly) to one or more antennas, such as antennas 337 and 338 as shown. Alternatively, the short to medium range wireless communication circuitry 329 may couple (e.g., communicatively; directly or indirectly) to the antennas 335 and 336 in addition to, or instead of, coupling (e.g., communicatively; directly or indirectly) to the antennas 337 and 338. The short to medium range wireless communication circuitry 329 and/or cellular communication circuitry 330 may include multiple receive chains and/or multiple transmit chains for receiving and/or transmitting multiple spatial streams, such as in a multiple-input multiple output (MIMO) configuration.

In some embodiments, as further described below, cellular communication circuitry 330 may include dedicated receive chains (including and/or coupled to, e.g., communicatively; directly or indirectly. dedicated processors and/or radios) for multiple radio access technologies (RATs) (e.g., a first receive chain for LTE and a second receive chain for 5G NR). In addition, in some embodiments, cellular communication circuitry 330 may include a single transmit chain that may be switched between radios dedicated to specific RATs. For example, a first radio may be dedicated to a first RAT, e.g., LTE, and may be in communication with a dedicated receive chain and a transmit chain shared with an additional radio, e.g., a second radio that may be dedicated to a second RAT, e.g., 5G NR, and may be in communication with a dedicated receive chain and the shared transmit chain.

The communication device 106 may also include and/or be configured for use with one or more user interface elements. The user interface elements may include any of various elements, such as display 360 (which may be a touchscreen display), a keyboard (which may be a discrete keyboard or may be implemented as part of a touchscreen display), a mouse, a microphone and/or speakers, one or more cameras, one or more buttons, and/or any of various other elements capable of providing information to a user and/or receiving or interpreting user input.

The communication device 106 may further include one or more smart cards 345 that include SIM (Subscriber Identity Module) functionality, such as one or more UICC(s) (Universal Integrated Circuit Card(s)) cards 345.

As shown, the SOC 300 may include processor(s) 302, which may execute program instructions for the communication device 106 and display circuitry 304, which may perform graphics processing and provide display signals to the display 360. The processor(s) 302 may also be coupled to memory management unit (MMU) 340, which may be configured to receive addresses from the processor(s) 302 and translate those addresses to locations in memory (e.g., memory 306, read only memory (ROM) 350, NAND flash memory 310) and/or to other circuits or devices, such as the display circuitry 304, short range wireless communication circuitry 229, cellular communication circuitry 330, connector I/F 320, and/or display 360. The MMU 340 may be configured to perform memory protection and page table translation or set up. In some embodiments, the MMU 340 may be included as a portion of the processor(s) 302.

As noted above, the communication device 106 may be configured to communicate using wireless and/or wired communication circuitry. The communication device 106 may also be configured to determine a physical downlink shared channel scheduling resource for a user equipment device and a base station. Further, the communication device 106 may be configured to group and select CCs from the wireless link and determine a virtual CC from the group of selected CCs. The wireless device may also be configured to perform a physical downlink resource mapping based on an aggregate resource matching patterns of groups of CCs.

As described herein, the communication device 106 may include hardware and software components for implementing the above features for determining a physical downlink shared channel scheduling resource for a communications device 106 and a base station. The processor 302 of the communication device 106 may be configured to implement part or all of the features described herein, e.g., by executing program instructions stored on a memory medium (e.g., a non-transitory computer-readable memory medium). Alternatively (or in addition), processor 302 may be configured as a programmable hardware element, such as an FPGA (Field Programmable Gate Array), or as an ASIC (Application Specific Integrated Circuit). Alternatively (or in addition) the processor 302 of the communication device 106, in conjunction with one or more of the other components 300, 304, 306, 310, 320, 329, 330, 340, 345, 350, 360 may be configured to implement part or all of the features described herein.

In addition, as described herein, processor 302 may include one or more processing elements. Thus, processor 302 may include one or more integrated circuits (ICs) that are configured to perform the functions of processor 302. In addition, each integrated circuit may include circuitry (e.g., first circuitry, second circuitry, etc.) configured to perform the functions of processor(s) 302.

Further, as described herein, cellular communication circuitry 330 and short range wireless communication circuitry 329 may each include one or more processing elements. In other words, one or more processing elements may be included in cellular communication circuitry 330 and, similarly, one or more processing elements may be included in short range wireless communication circuitry 329. Thus, cellular communication circuitry 330 may include one or more integrated circuits (ICs) that are configured to perform the functions of cellular communication circuitry 330. In addition, each integrated circuit may include circuitry (e.g., first circuitry, second circuitry, etc.) configured to perform the functions of cellular communication circuitry 230. Similarly, the short range wireless communication circuitry 329 may include one or more ICs that are configured to perform the functions of short range wireless communication circuitry 32. In addition, each integrated circuit may include circuitry (e.g., first circuitry, second circuitry, etc.) configured to perform the functions of short range wireless communication circuitry 329.

Figure 4:
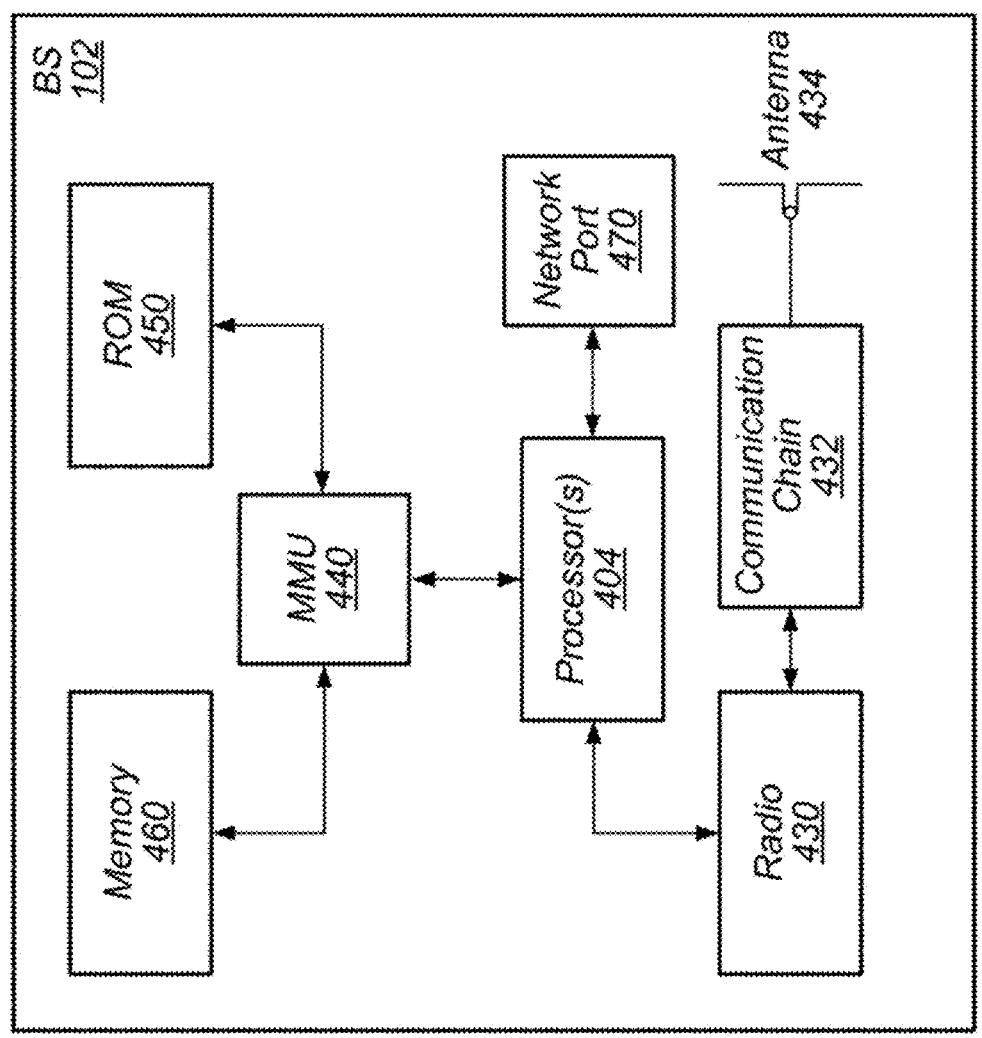
FIG. 4 illustrates an example block diagram of a BS, according to some embodiments.

FIG. 4 illustrates an example block diagram of a base station 102, according to some embodiments. It is noted that the base station of FIG. 4 is merely one example of a possible base station. As shown, the base station 102 may include processor(s) 404 which may execute program instructions for the base station 102. The processor(s) 404 may also be coupled to memory management unit (MMU) 440, which may be configured to receive addresses from the processor(s) 404 and translate those addresses to locations in memory (e.g., memory 460 and read only memory (ROM) 450) or to other circuits or devices.

The base station 102 may include at least one network port 470. The network port 470 may be configured to couple to a telephone network and provide a plurality of devices, such as UE 106, access to the telephone network as described above in FIGS. 1 and 2.

The network port 470 (or an additional network port) may also or alternatively be configured to couple to a cellular network, e.g., a core network of a cellular service provider. The core network may provide mobility related services and/or other services to a plurality of devices, such as UE 106. In some cases, the network port 470 may couple to a telephone network via the core network, and/or the core network may provide a telephone network (e.g., among other UEs serviced by the cellular service provider).

In some embodiments, base station 102 may be a next generation base station, e.g., a 5G New Radio (5G NR) base station, or "gNB". In such embodiments, base station 102 may be connected to a legacy evolved packet core (EPC) network and/or to a NR core (NRC) network. In addition, base station 102 may be considered a 5G NR cell and may include one or more transition and reception points (TRPs). In addition, a UE capable of operating according to 5G NR may be connected to one or more TRPs within one or more gNB s.

The base station 102 may include at least one antenna 434, and possibly multiple antennas. The at least one antenna 434 may be configured to operate as a wireless transceiver and may be further configured to communicate with UE 106 via radio 430. The antenna 434 communicates with the radio 430 via communication chain 432. Communication chain 432 may be a receive chain, a transmit chain or both. The radio 430 may be configured to communicate via various wireless communication standards, including, but not limited to, 5G NR, LTE, LTE-A, GSM, UMTS, CDMA2000, Wi-Fi, etc.

The base station 102 may be configured to communicate wirelessly using multiple wireless communication standards. In some instances, the base station 102 may include multiple radios, which may enable the base station 102 to communicate according to multiple wireless communication technologies. For example, as one possibility, the base station 102 may include an LTE radio for performing communication according to LTE as well as a 5G NR radio for performing communication according to 5G NR. In such a case, the base station 102 may be capable of operating as both an LTE base station and a 5G NR base station. As another possibility, the base station 102 may include a multi-mode radio which is capable of performing communications according to any of multiple wireless communication technologies (e.g., 5G NR and Wi-Fi, LTE and Wi-Fi, LTE and UMTS, LTE and CDMA2000, UMTS and GSM, etc.).

As described further subsequently herein, the BS 102 may include hardware and software components for implementing or supporting implementation of features described herein. The processor 404 of the base station 102 may be configured to implement or support implementation of part or all of the methods described herein, e.g., by executing program instructions stored on a memory medium (e.g., a non-transitory computer-readable memory medium). Alternatively, the processor 404 may be configured as a programmable hardware element, such as an FPGA (Field Programmable Gate Array), or as an ASIC (Application Specific Integrated Circuit), or a combination thereof. Alternatively (or in addition) the processor 404 of the BS 102, in conjunction with one or more of the other components 430, 432, 434, 440, 450, 460, 470 may be configured to implement or support implementation of part or all of the features described herein.

In addition, as described herein, processor(s) 404 may be comprised of one or more processing elements. In other words, one or more processing elements may be included in processor(s) 404. Thus, processor(s) 404 may include one or more integrated circuits (ICs) that are configured to perform the functions of processor(s) 404. In addition, each integrated circuit may include circuitry (e.g., first circuitry, second circuitry, etc.) configured to perform the functions of processor(s) 404.

Further, as described herein, radio 430 may be comprised of one or more processing elements. In other words, one or more processing elements may be included in radio 430. Thus, radio 430 may include one or more integrated circuits (ICs) that are configured to perform the functions of radio 430. In addition, each integrated circuit may include circuitry (e.g., first circuitry, second circuitry, etc.) configured to perform the functions of radio 430.

Figure 5:
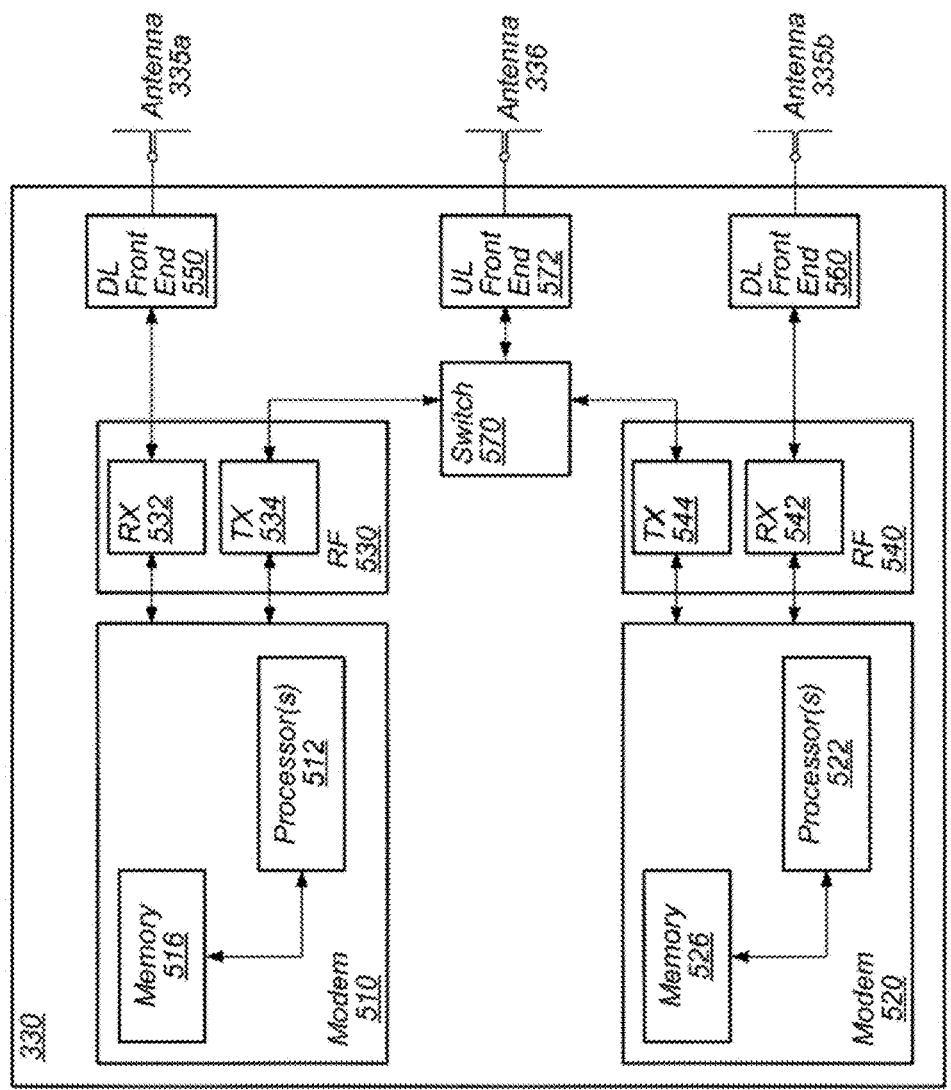
FIG. 5 illustrates an example block diagram of cellular communication circuitry, according to some embodiments.

FIG. 5 illustrates an example simplified block diagram of cellular communication circuitry, according to some embodiments. It is noted that the block diagram of the cellular communication circuitry of FIG. 5 is only one example of a possible cellular communication circuit. According to embodiments, cellular communication circuitry 330 may be included in a communication device, such as communication device 106 described above. As noted above, communication device 106 may be a user equipment (UE) device, a mobile device or mobile station, a wireless device or wireless station, a desktop computer or computing device, a mobile computing device (e.g., a laptop, notebook, or portable computing device), a tablet and/or a combination of devices, among other devices.

The cellular communication circuitry 330 may couple (e.g., communicatively; directly or indirectly) to one or more antennas, such as antennas 335 *a-b* and 336 as shown (in FIG. 3). In some embodiments, cellular communication circuitry 330 may include dedicated receive chains (including and/or coupled to, e.g., communicatively; directly or indirectly. dedicated processors and/or radios) for multiple RATs (e.g., a first receive chain for LTE and a second receive chain for 5G NR). For example, as shown in FIG. 5, cellular communication circuitry 330 may include a modem 510 and a modem 520. Modem 510 may be configured for communications according to a first RAT, e.g., such as LTE or LTE-A, and modem 520 may be configured for communications according to a second RAT, e.g., such as 5G NR.

As shown, modem 510 may include one or more processors 512 and a memory 516 in communication with processors 512. Modem 510 may be in communication with a radio frequency (RF) front end 530. RF front end 530 may include circuitry for transmitting and receiving radio signals. For example, RF front end 530 may include receive circuitry (RX) 532 and transmit circuitry (TX) 534. In some embodiments, receive circuitry 532 may be in communication with downlink (DL) front end 550, which may include circuitry for receiving radio signals via antenna 335*a*.

Similarly, modem 520 may include one or more processors 522 and a memory 526 in communication with processors 522. Modem 520 may be in communication with an RF front end 540. RF front end 540 may include circuitry for transmitting and receiving radio signals. For example, RF front end 540 may include receive circuitry 542 and transmit circuitry 544. In some embodiments, receive circuitry 542 may be in communication with DL front end 560, which may include circuitry for receiving radio signals via antenna 335*b*.

In some embodiments, a switch 570 may couple transmit circuitry 534 to uplink (UL) front end 572. In addition, switch 570 may couple transmit circuitry 544 to UL front end 572. UL front end 572 may include circuitry for transmitting radio signals via antenna 336. Thus, when cellular communication circuitry 330 receives instructions to transmit according to the first RAT (e.g., as supported via modem 510), switch 570 may be switched to a first state that allows modem 510 to transmit signals according to the first RAT (e.g., via a transmit chain that includes transmit circuitry 534 and UL front end 572). Similarly, when cellular communication circuitry 330 receives instructions to transmit according to the second RAT (e.g., as supported via modem 520), switch 570 may be switched to a second state that allows modem 520 to transmit signals according to the second RAT (e.g., via a transmit chain that includes transmit circuitry 544 and UL front end 572).

As described herein, the modem 510 may include hardware and software components for implementing the above features or for selecting a periodic resource part for a user equipment device and a base station, as well as the various other techniques described herein. The processors 512 may be configured to implement part or all of the features described herein, e.g., by executing program instructions stored on a memory medium (e.g., a non-transitory computer-readable memory medium). Alternatively (or in addition), processor 512 may be configured as a programmable hardware element, such as an FPGA (Field Programmable Gate Array), or as an ASIC (Application Specific Integrated Circuit). Alternatively (or in addition) the processor 512, in conjunction with one or more of the other components 530, 532, 534, 550, 570, 572, 335 and 336 may be configured to implement part or all of the features described herein.

In addition, as described herein, processors 512 may include one or more processing elements. Thus, processors 512 may include one or more integrated circuits (ICs) that are configured to perform the functions of processors 512. In addition, each integrated circuit may include circuitry (e.g., first circuitry, second circuitry, etc.) configured to perform the functions of processors 512.

As described herein, the modem 520 may include hardware and software components for implementing the above features for selecting a periodic resource on a wireless link between a UE and a base station, as well as the various other techniques described herein. The processors 522 may be configured to implement part or all of the features described herein, e.g., by executing program instructions stored on a memory medium (e.g., a non-transitory computer-readable memory medium). Alternatively (or in addition), processor 522 may be configured as a programmable hardware element, such as an FPGA (Field Programmable Gate Array), or as an ASIC (Application Specific Integrated Circuit). Alternatively (or in addition) the processor 522, in conjunction with one or more of the other components 540, 542, 544, 550, 570, 572, 335 and 336 may be configured to implement part or all of the features described herein.

In addition, as described herein, processors 522 may include one or more processing elements. Thus, processors 522 may include one or more integrated circuits (ICs) that are configured to perform the functions of processors 522. In addition, each integrated circuit may include circuitry (e.g., first circuitry, second circuitry, etc.) configured to perform the functions of processors 522.

In the current NR design, as given by 3GPP TS 38.331, a search space is configured with monitoringSlotPeriodicityAndOffset, duration and monitoringSymbolsWithinSlot. As PDCCH monitoring can consume UE power, the Rel-15/Rel-16 design leads to UE power consumption even if there is no traffic to the UE. Consequently, incurring PDCCH monitoring for the actual traffic, and adaption of PDCCH monitoring according traffic change in terms of periodicity and offset in a periodicity can limit PDCCH monitoring to essential processing needed for the actual traffic, for example, in DL for SPS PDSCH, and in UL for CG PUSCH. Also the PDCCH monitoring is configured through RRC signaling in NR Rel-15/16 design, which may not be nimble enough to adapt to traffic change. To address those issues, in one embodiment, adaptation through MAC CE can be used, for example, a search space can be turned on/activated/configured or turned off/de-activated/de-configured by a MAC CE. Alternatively or in addition, signaling concerning monitoringSlotPeriodicityAndOffset and/or duration and/or monitoringSymbolsWithinSlot can be provided in the MAC CE. monitoringSlotPeriodicityAndOffset can be represented by $M_1$, $M_2$ and signaling for offset through RRC signaling or with MAC CE. Some essential signaling for network operation can still be indicated by PDCCH monitored at search space(s) as configured by RRC with monitoringSlotPeriodicityAndOffset and/or duration and/or monitoringSymbolsWithinSlot in the information element (IE). In one embodiment, for a proposed search space linked to a DL SPS, monitoringSlotPeriodicityAndOffset and duration can be omitted in the RRC configured of the search space, instead, and the monitoring occasions of PDCCH is provided by the DL SPS configuration such as its periodicity (e.g., with "periodicity" or $M_1/M_2$ and the jitter window design). In one option, there is one PDCCH monitoring occasion for each DL SPS reception occasion. In another option, there is one PDCCH monitoring occasion on the reference reception occasion.

Figure 6:
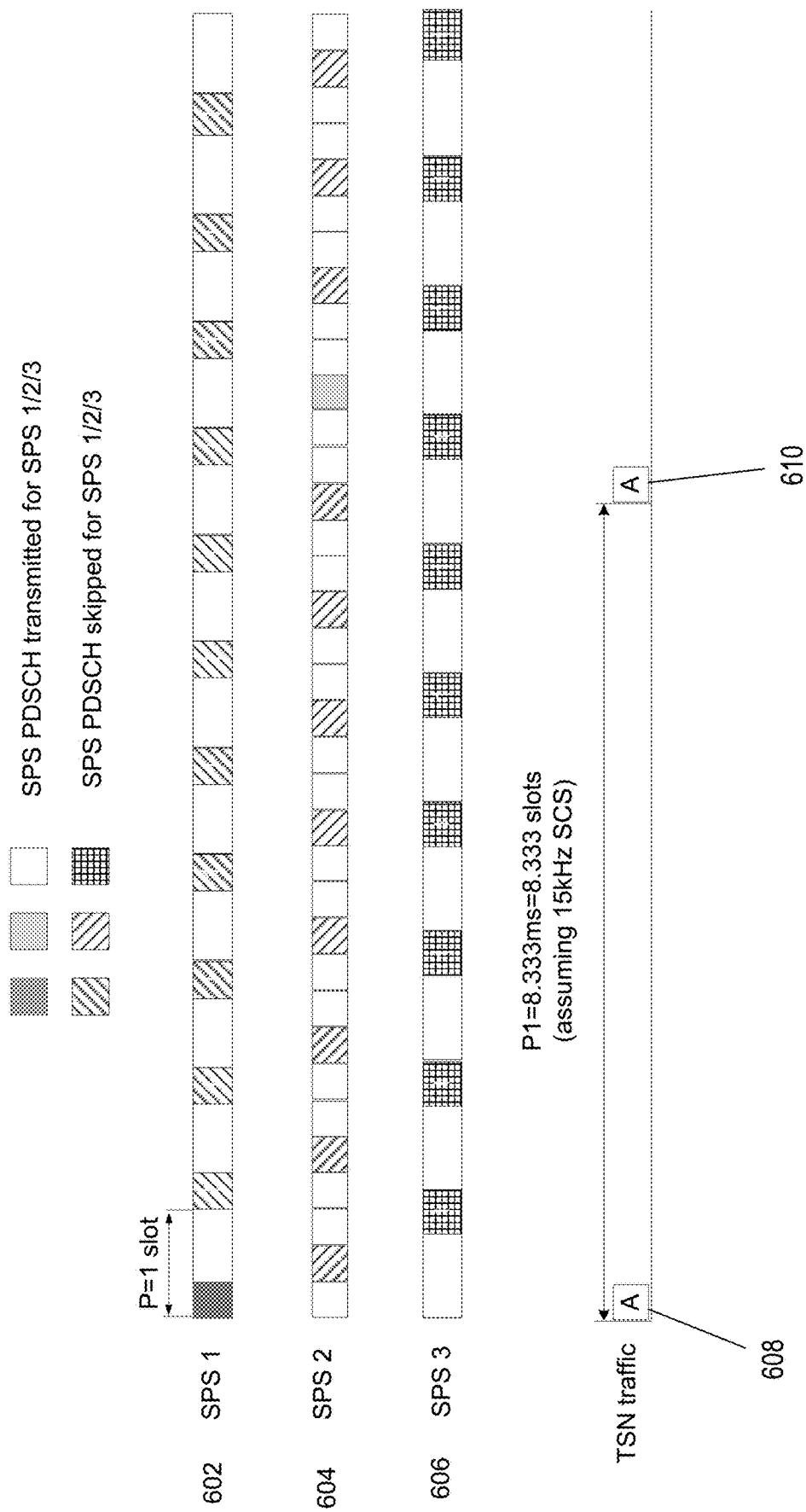
FIG. 6 is an illustration of some embodiments of over-provisioning of resource with multiple SPS, according to some embodiments.

FIG. 6 illustrates some embodiments of overprovisioning of resource with multiple SPS. Referring to FIG. 6, although the network does not send any traffic to the UEs at some occasions (e.g., occasions from SPS1 602; SPS2 604; SPS3 606 not overlapping with the actual Time-Sensitive Networking (TSN) traffic (blocks A 608 and 610), the UE does not have such information. Therefore, the UE needs to perform channel estimation on the DMRS symbols and/or check the calculated LLRs to decide whether there is an actual transmission from the network or not. As a result, the UE power consumption can be significant due to the DL processing to determine the presence of an actual transmission or not.

For video stream with a cadence at 60 frames per second, the periodicity can be represented as a fraction of two integers. For a NR system with a sub-carrier spacing of 15 kHz, there are 1000 slots in a second. Then, the periodicity can be represented as 1000×1/60=50/3 slots. Therefore, the periodicity can be represented with a first integer=50 and a second integer=3, or a ratio 50/3 directly, or represented as a frequency (e.g. 60 Hz for 60 frames per second).

Considering a DL traffic, a jitter in the traffic arrival may be inevitable for a packet traversing transport network/core network to reach the base station, Then, depending on the use of de-jitter buffer, and where the de-jitter buffer is located, such a jitter may be relatively large or may be small. A jitter issue may not be limited to the DL traffic. Also considering a UL traffic, then depending whether dedicated hardware is used to generate audio or video streams, whether a Real Time Operating System (RTOS) is used at the user device, and/or the RTOS's scheduling, there can also be jitter in the uplink traffic generation.

In some embodiments, for a SPS (or a CG), the periodicity of the SPS (periodicity of the CG), can be configured by some or all parameters described below. For simplicity purposes, a design for the SPS will be described herein. The same or a similar design can be applied to the CG.

In some embodiments, the parameters that can be used to configure the periodicity of the SPS can include an initial offset in slots, $I_{shift}$, two integers to support the periodicity of traffic $M_1$ and $M_2$, and a round operation: "round", r(x) "ceil", c(x), round up to the smallest integer), "floor", f(x), (round down to the largest integer), which decides which function among r(x), c(x) or f(x) to use in the calculation below.

In some embodiments, the UE expects a SPS transmission from the network at slot $mod(g(k), N_{slot}^{subframe,\mu})$ within a subframe, where the index of the subframe in a radio frame is given by $mod(\lfloor g(k)/N_{slot}^{subframe,\mu} \rfloor, N_{subframe}^{frame,\mu})$, where the index of the radio frame in a hyperframe is given by $mod(\lfloor g(k)/N_{slot}^{frame,\mu} \rfloor, N_{frame}^{hyperframe,\mu})$, and where $g(k)=f(M_1/M_2 \times k)+I_{shift}$, where k is a running index.

At numerology given by μ (μ=0 for 15 KHz subcarrier spacing, μ=1 for 30 KHz subcarrier spacing, μ=2 for 60 KHz subcarrier spacing, μ=3 for 120 KHz subcarrier spacing), $N_{slot}^{subframe,\mu}$ is the number of slots in a subframe (1 slot/subframe for μ=0, 2 slots/subframe for μ=1, 4 slots/subframe for μ=2, 8 slots/subframe for μ=3); $N_{slot}^{subframe,\mu}$ is the number of slots in a radio frame (note $N_{slot}^{subframe,\mu}=N_{subframe}^{frame,\mu} \times N_{slot}^{subframe,\mu}$); $N_{slot}^{subframe,\mu}$ is the number of subframes in a frame (10 in the current NR design for μ=0, 1, 2, 3); and $N_{frame}^{hyperframe,\mu}$ is the number of frames in a hyperframe. In the current NR design, there is no concept such as "hyperframe" (the concept of hyperframe is used in narrowband Internet of Things (NB IoT), in which a range of radio frame indices from 0 to 1023 is used). In this present disclosure, the number of frames in a hyperframe is assumed to be 1024.

In some embodiments, the periodicity can be represented by $M_1/M_2$ in slots, $M_1/M_2$ in symbols, or in absolute time unit (e.g., $M_1/M_2$ in milliseconds (subframes)), where $M_1$ and $M_2$ are two integers signaled in replacement of or in addition to "periodicity" in the SPS configuration. With a single SPS configuration, the most frequent arrival rate with a given numerology μ is $14 \times 2^\mu \times 10^3$ Hz.

The configuration can be performed using a Radio Resource Control (RRC) signaling or Medium Access Control (MAC) Control Element (CE).

For a DL SPS, some transmission parameters can be configured using the RRC signaling, and some other transmission parameters can be provided by a dynamic signaling via an activation Downlink Control Information (DCI) of a SPS configuration. The activation DCI can indicate an activation of the DL SPS. In NR Rel-15, a single SPS can be supported in a cell group. In NR Rel-16, up to 8 SPS configurations can be supported over a Bandwidth Part (BWP) in a cell, hence, the support of SPS is much stronger in Rel-16.

If the periodicity $M_1/M_2$ in milliseconds is considered, the following change (marked in italic) can be made to determine occasions where DL SPS grants may occur. After a downlink assignment is configured for an SPS, the Medium Access Control (MAC) entity shall consider sequentially that the $N^{th}$ downlink assignment occurs in a slot for which: (numberOfSlotsPerFrame×SFN+slot number in the frame)=[(numberOfSlotsPerFrame×$SFN_{start\ time}$+$slot_{start\ time}$)+ceil($N \times M_1/M_2 \times$numberOfSlotsPerFrame/10)] modulo (1024×numberOfSlotsPerFrame), where $SFN_{start\ time}$ and $slot_{start\ time}$ are the SFN and slot, respectively, of the first transmission of PDSCH where the configured downlink assignment was (re-)initialized. Note in a case of an unaligned SFN across carriers in a cell group, the System Frame Number (SFN) of the concerned Serving Cell is used to calculate the occurrences of configured downlink assignments. The SFN increases by 1 for every 10 ms from 0 to 1023. Therefore, the total time for the SFN for a hyperframe (considering 1024 frames) is 10.24 seconds. The input to the equation above includes numberOfSlotsPerFrame, M1, M2, $SFN_{start\ time}$, $slot_{start\ time}$, and a running index, N. The output of the equation includes SFN and slot number in the frame.

For a UL CG, periodicity at 2 symbols and 7 symbols can be supported. The equation to determine occasions where UL grants occur includes treatment of periodicity as an integer multiple of symbols. After a downlink assignment is configured for SPS, the MAC entity shall consider sequentially that the $N^{th}$ downlink assignment occurs in the slot for which: [(SFN×numberOfSlotsPerFrame×numberOfSymbolsPerSlot)+(slot number in the frame×numberOfSymbolsPerSlot)+symbol number in the slot]=[($SFN_{start\ time}$×numberOfSlotsPerFrame×numberOfSymbolsPerSlot+$slot_{start\ time}$×numberOfSymbolsPerSlot+$symbol_{start\ time}$)+ceil(N×M₁/M₂)] modulo (1024×numberOfSlotsPerFrame×numberOfSymbolsPerSlot), where $SFN_{start\ time}$, $slot_{start\ time}$, and $symbol_{start\ time}$ are the SFN, slot, and symbol, respectively, of the first transmission opportunity of PDSCH where the configured downlink grant was (re-)initialised. Note in a case of unaligned SFN across carriers in a cell group, the SFN of the concerned Serving Cell is used to calculate the occurrences of configured downlink assignments. The input to the above equation can include numberOfSlotsPerFrame, numberOfSymbolsPerSlot, M1, M2, $SFN_{start\ time}$, $slot_{start\ time}$, and $symbol_{start\ time}$, and N which is a running index. The output to the above equation can include SFN, slot number in the frame, and symbol number in the slot.

In some embodiments, for a CG Type 1 with periodicity in symbols, after an uplink grant is configured for a configured grant Type 1, the MAC entity shall consider sequentially that the $N^{th}$ (N>=0) uplink grant occurs in the symbol for which: [(SFN×numberOfSlotsPerFrame×numberOfSymbolsPerSlot)+(slot number in the frame×numberOfSymbolsPerSlot)+symbol number in the slot]=(timeReferenceSFN×numberOfSlotsPerFrame×numberOfSymbolsPerSlot+timeDomainOffset×numberOfSymbolsPerSlot+S+ceil(N×M₁/M₂)) modulo (1024×numberOfSlotsPerFrame×numberOfSymbolsPerSlot).

After an uplink grant is configured for a configured grant Type 2, the MAC entity shall consider sequentially that the $N^{th}$ (N>=0) uplink grant occurs in the symbol for which: [(SFN×numberOfSlotsPerFrame×numberOfSymbolsPerSlot)+(slot number in the frame×numberOfSymbolsPerSlot)+symbol number in the slot]=[($SFN_{start\ time}$×numberOfSlotsPerFrame×numberOfSymbolsPerSlot+$slot_{start\ time}$×numberOfSymbolsPerSlot+$symbol_{start\ time}$)+ceil(N×M₁/M₂)] modulo (1024×numberOfSlotsPerFrame×numberOfSymbolsPerSlot), where $SFN_{start\ time}$, $slot_{start\ time}$, and $symbol_{start\ time}$ are the SFN, slot, and symbol, respectively, of the first transmission opportunity of PUSCH where the configured uplink grant was (re-)initialised.

The signaling capacity and signal overhead issues can be considered in situations where repeated traffic arrival pattern occur across hyperframes. First, the number of packet arrivals in a hyperframe or 1024 radio frames can be reduced to lowest terms with integers K and D based on the equation below. It can be observed that the traffic arrival pattern repeats for every D hyperframes.

$$\frac{10.24 \times 1000}{\frac{M_1}{M_2}} = \frac{K}{D}$$

As with the periodicity in milliseconds, the following change (marked in italic) is made to determine occasions where DL SPS grants occur. After a downlink assignment is configured for SPS, the MAC entity shall consider sequentially that the $N^{th}$ downlink assignment occurs in the slot for which: (numberOfSlotsPerFrame×1024×d+numberOfSlotsPerFrame×SFN+slot number in the frame)=[(numberOfSlotsPerFrame×$SFN_{start\ time}$+$slot_{start\ time}$)+ceil(N×M₁/M₂×numberOfSlotsPerFrame/10)] modulo (D×1024×numberOfSlotsPerFrame), where $SFN_{start\ time}$ and $slot_{start\ time}$ are the SFN and slot, respectively, of the first transmission of PDSCH where the configured downlink assignment was (re-)initialized. Note in case of unaligned SFN across carriers in a cell group, the SFN of the concerned Serving Cell is used to calculate the occurrences of configured downlink assignments. Note that d is zero at DL SPS (re)-initialization, and d increments by 1 for every 1024 radio frames.

If M₁/M₂ in symbols is used, the following change (marked in italic) is made to determine occasions where DL SPS grants occur. After a downlink assignment is configured for SPS, the MAC entity shall consider sequentially that the $N^{th}$ downlink assignment occurs in the slot for which: [(d×1024×numberOfSlotsPerFrame×numberOfSymbolsPerSlot)+(SFN×numberOfSlotsPerFrame×numberOfSymbolsPerSlot)+(slot number in the frame×numberOfSymbolsPerSlot)+symbol number in the slot]=[($SFN_{start\ time}$×numberOfSlotsPerFrame×numberOfSymbolsPerSlot+$slot_{start\ time}$×numberOfSymbolsPerSlot+$symbol_{start\ time}$)+ceil(N×M₁/M₂)] modulo (D×1024×numberOfSlotsPerFrame×numberOfSymbolsPerSlot), where $SFN_{start\ time}$, $slot_{start\ time}$, and $symbol_{start\ time}$ are the SFN, slot, and symbol, respectively, of the first transmission opportunity of PDSCH where the configured downlink grant was (re-)initialised. Note in case of unaligned SFN across carriers in a cell group, the SFN of the concerned Serving Cell is used to calculate the occurrences of configured downlink assignments. Note that dis zero at DL SPS (re)-initialization, and d is incremented by 1 for every 1024 radio frames from DL SPS (re)-initialization.

Similarly, for configured grants, the following changes (marked in italic) can be made. After an uplink grant is configured for a configured grant Type 1, the MAC entity shall consider sequentially that the $N^{th}$ (N>=0) uplink grant occurs in the symbol for which: [(d×1024×numberOfSlotsPerFrame×numberOfSymbolsPerSlot)+(SFN×numberOfSlotsPerFrame×numberOfSymbolsPerSlot)+(slot number in the frame×numberOfSymbolsPerSlot)+symbol number in the slot]=(timeReferenceSFN×numberOfSlotsPerFrame×numberOfSymbolsPerSlot+timeDomainOffset×numberOfSymbolsPerSlot+S+ceil(N×M₁/M₂)) modulo (D×1024×numberOfSlotsPerFrame×numberOfSymbolsPerSlot).

After an uplink grant is configured for a configured grant Type 2, the MAC entity shall consider sequentially that the $N^h$ (N>=0) uplink grant occurs in the symbol for which: [(d×1024×numberOfSlotsPerFrame×numberOfSymbolsPerSlot)+(SFN×numberOfSlotsPerFrame×numberOfSymbolsPerSlot)+(slot number in the frame×numberOfSymbolsPerSlot)+symbol number in the slot]=[($SFN_{start\ time}$×numberOfSlotsPerFrame×numberOfSymbolsPerSlot+ slot$_{start\ time}$×numberOfSymbolsPerSlot+symbol$_{start\ time}$)+ceil(N×M$_1$/M$_2$))] modulo (D×1024×numberOfSlotsPerFrame×numberOfSymbolsPerSlot), where SFN$_{start\ time}$, slot$_{start\ time}$, and symbol$_{start\ time}$ are the SFN, slot, and symbol, respectively, of the first transmission opportunity of PUSCH where the configured uplink grant was (re-)initialised. Note that dis zero at UL configured grant (re)-initialization, and d is incremented by 1 for every 1024 radio frames from UL configured grant (re)-initialization.

Figure 7A:
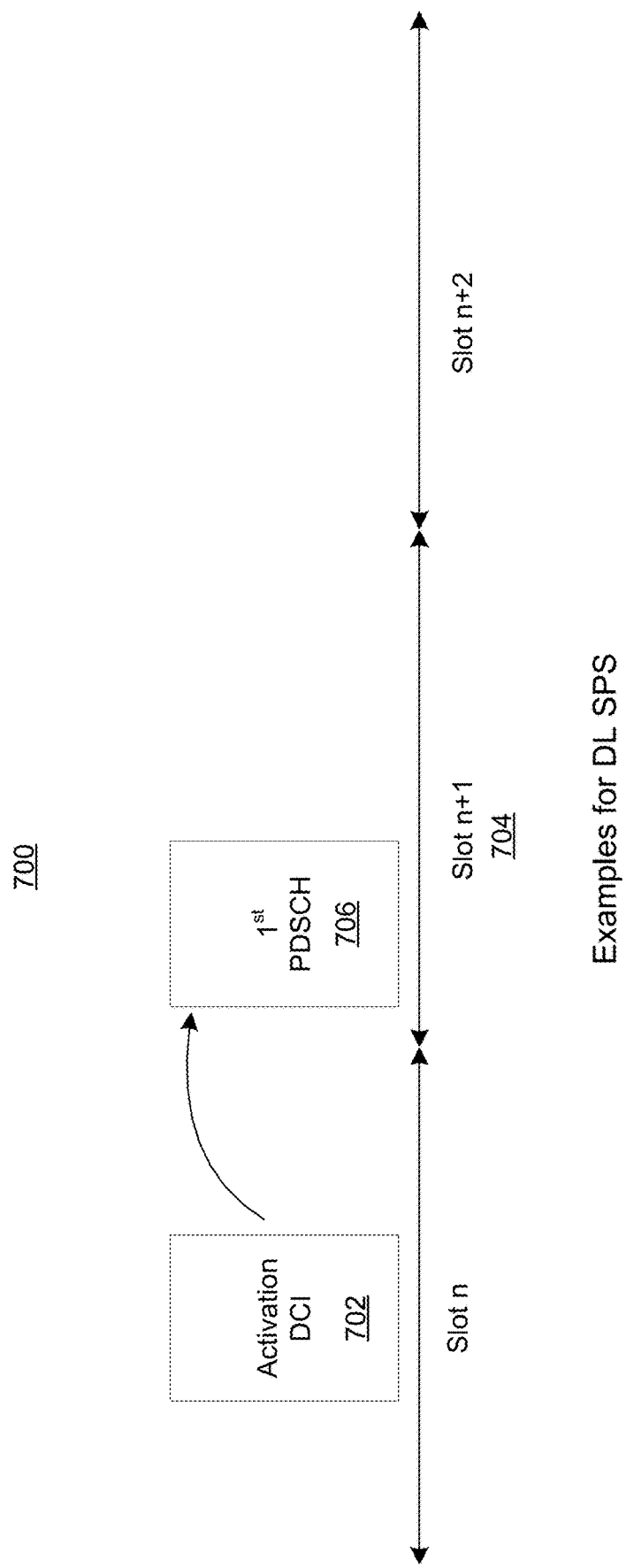
FIG. 7A is an illustration of some embodiments of how an initial offset can be determined for a downlink (DL), according to some embodiments.

FIG. 7A illustrates some embodiments of how an initial offset can be determined for a downlink (DL) SPS 700. In some embodiments, M$_1$ and M$_2$ can be included in the RRC signaling for a DL SPS configuration (see code below). In these embodiments, instead of setting "periodicity" for a SPS configuration, two positive integers, M1 (e.g., at 50) and M2 (e.g., at 3) can be configured. In these embodiments, 16 bits are assumed for the configuration, and other numbers of bits can be also considered.

```
SPS-Config ::= SEQUENCE {
    periodicity ENUMERATED {ms10, ms20, ms32, ms40, ms64, ms80, ms128, ms160, ms320, ms640,
        spare6, spare5, spare4, spare3, spare2, spare1},
    M1 INTEGER (0 ... (2^16-1))
    M2 INTEGER (0 ... (2^16-1))
    nrofHARQ-Processes INTEGER (1..8),
    n1PUCCH-AN PUCCH-ResourceId OPTIONAL, -- Need M
    mcs-Table ENUMERATED (gam64LowSE) OPTIONAL, -- Need S
    ...
}
```

Referring to FIG. 7A, the SPS activation DCI 702 for a SPS configuration 700 can indicate when the first DL SPS transmission of the current SPS configuration to be expected by the UE. In these embodiments, I$_{shift}$ is associated with the slot index of the slot 704 where the first DL SPS 706 appears. As illustrated in FIG. 7A, I$_{shift}$=n+1. Using the following equation, (numberOfSlotsPerFrame×SFN+slot number in the frame)=[(numberOfSlotsPerFrame× SFN$_{start\ time}$+slot$_{start\ time}$)+ceil(N×M_1/M_2×numberOfSlotsPerFrame/10)] modulo (1024×numberOfSlotsPerFrame), SFN$_{start\ time}$ and slot$_{start\ time}$ can be determined according to the activation DCI.

In some other embodiments, M$_1$ and M$_2$ may not be included in the RRC signaling for a DL SPS configuration (see code below).

```
SPS-Config ::= SEQUENCE {
    periodicity ENUMERATED {ms10, ms20, ms32, ms40, ms64, ms80, ms128, ms160, ms320, ms640,
        spare6, spare5, spare4, spare3, spare2, spare1},
    M1 (0 ... (2^16-1))
    M2 (0 ... (2^16-1))
    nrofHARQ-Processes INTEGER (1..8),
    n1PUCCH-AN PUCCH-ResourceId OPTIONAL, -- Need M
    mca-Table ENUMERATED (gam64LowSE) OPTIONAL, -- Need S
    ...
}
```

M$_1$ and M$_2$ may not be included in the RRC signaling for the DL SPS configuration because the base station (e.g., gNB) expects frequent changes with the choice of M$_1$ and M$_2$. the In addition, the base station may not be fast enough in configuring M$_1$ and M$_2$ via the RRC signaling. Therefore, M$_1$ and M$_2$ are signaled in MAC CE to the UE. Medium Access Control (MAC) Control Element (CE) can include the first and second positive integers. The SPS activation DCI for a SPS configuration can indicate when the first DL SPS transmission of the current SPS configuration associated with current activation DCI to be expected by the UE.

In this case, I$_{shift}$ is associated with the slot index of the slot where the first DL SPS appears. Using the following equation, (numberOfSlotsPerFrame×SFN+slot number in the frame)=[(numberOfSlotsPerFrame×SFN$_{start\ time}$+slot$_{start\ time}$)+ceil(N×M_1/M_2×numberOfSlotsPerFrame/10)] modulo (1024×numberOfSlotsPerFrame), SFN$_{start\ time}$ and slot$_{start\ time}$ can be determined according to the activation DCI SFN$_{start\ time}$ and slot$_{start\ time}$. Can be similarly determined.

In some other embodiments, M$_1$ and M$_2$ can be determined as described above. Due to jitter or accumulated timing difference resulting from a difference between the real traffic periodicity and M$_1$/M$_2$, the network may need to, once in a while, adjust I$_{shift}$ or SFN$_{start\ time}$ and slot$_{start\ time}$. For example, the network (e.g., gNB) can send another activation DCI for a given DL SPS configuration to adjust I$_{shift}$ without first de-activating the DL SPS configuration. The UE can receive an activation DCI for the DL SPS or the UL CG configuration to adjust I$_{shift}$ or a running index, or both, without deactivating the DL SPS or the UL CG configuration. In NR rel-16, up to 8 DL SPS configurations are supported on a BWP in a cell. Assuming a DL SPS configuration 1 is configured with M$_1$=25 and M$_2$=3, and I$_{shift}$=3 from a first activation DCI. Then the gNB, without de-activating DL SPS configuration 1 first, sends another activation DCI indicating a Physical Downlink Shared Channel (PDSCH) transmission in slot 5. Then, the UE assume I$_{shift}$=5 once it receives the second activation DCI.

In some other embodiments, M$_1$ and M$_2$ can be determined as described above. Due to jitter or accumulated timing difference resulting from a difference between the real traffic periodicity and M$_1$/M$_2$, the network may need, once in a while, to adjust I$_{shift}$. For example, the gNB can send a MAC CE to adjust I$_{shift}$. In NR rel-16, up to 8 DL SPS configurations are supported on a BWP in a cell. Assuming DL SPS configuration 1 is configured with M$_1$=25 and M$_2$=3, and I$_{shift}$=3 from a first activation DCI. Then the gNB, sends a MAC CE with I$_{shift}$=5.

In the following, examples for the UL CG are described. There are two types (i.e., Type 1 CG and Type 2 CG) of CGs in NR. In Type 1 CG, every transmission parameter such as periodicity, offset, Modulation and Coding Scheme (MCS) level, etc. can be configured by RRC signaling. In Type 2 CG, some transmission parameters can be configured through RRC signaling, and other transmission parameters can be provided by a dynamic signaling through an activation DCI of a CG configuration. In NR Rel-15, at most a single CG can be supported on a cell. In NR Rel-16, up to 12 CG configurations are supported over a BWP in a cell, hence the support of CG is much stronger in Rel-16. Due to similarity between the DL SPS and the UL CG Type 2 (part of transmission parameters come from RRC signaling, the rest come from dynamic signaling with an activation DCI), the examples for the DL SPS can be replicated for the UL CG Type 2.

Figure 7B:
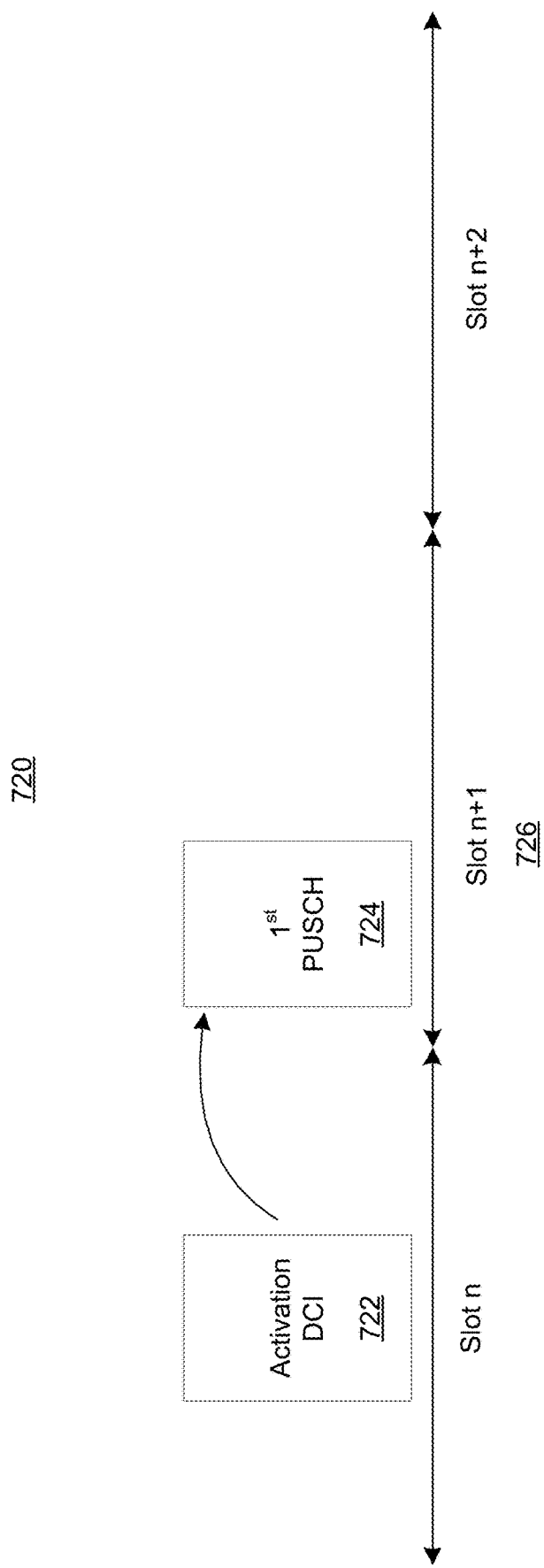
FIG. 7B is an illustration of some embodiments of how an initial offset can be determined for an uplink (UL) CG, according to some embodiments.

FIG. 7B illustrates embodiments how an initial offset is determined for an uplink (UL) CG 720. In some embodiments for the UL CG Type 2, $M_1$ and $M_2$ can be included in the RRC signaling for an UL CG configuration (see code below). In these embodiments, instead of setting "periodicity" for a CG configuration, M1 (e.g., at 50) and M2 (e.g., at 3) can be configured. In these embodiments, 16 bits are assumed for the configuration and other numbers of bits can be also considered. The CG activation DCI 722 for a CG configuration can indicate when the first UL CG transmission 724 of the current CG configuration to be expected by the UE. In these embodiments, the initial offset, $I_{shift}$ is associated with the slot index 726 of the slot where the first PUSCH appears. As illustrated in FIG. 7B, the initial offset, $I_{shift}$=n+1.

In some other embodiments, $M_1$ and $M_2$ can be determined as discussed above. Due to jitter or accumulated timing difference resulted from difference between the real traffic's periodicity and $M_1/M_2$, the network (e.g., gNB) may need, once in a while, to adjust shift. The gNB can send another activation DCI for a given UL CG configuration to adjust $I_{shift}$ without first deactivating the DL SPS configuration. In NR rel-16, up to 12 UL CG configurations are supported on a BWP in a cell. For example, assuming a UL CG configuration 1 is configured with $M_1$=25 and $M_2$=3, and $I_{shift}$=3 from a first activation Downlink Control Information (DCI). Then the gNB, without de-activating UL CG configuration 1 first, sends another activation DCI indicating a PUSCH transmission in slot 5 as a first transmission. Then, the UE assume $I_{shift}$=5 once it receives the second activation DCI.

In some other embodiments, $M_1$ and $M_2$ can be determined as discussed above. Due to jitter or accumulated timing difference resulted from difference between the real traffic's periodicity and $M_1/M_2$, the network may need to once in a while to adjust $I_{shift}$. The gNB can send a MAC CE to adjust $I_{shift}$. In NR rel-16, up to 12 UL CG configurations

```
ConfiguredGrantConfig ::= SEQUENCE {
    frequencyHopping ENUMERATED (intraSlot, interSlot) OPTIONAL, -- Need S
    cg-DMRS-Configuration DMRS-UplinkConfig,
    mcs-Table ENUMERATED (gam256, gam65LowSE) OPTIONAL, -- Need S
    mcs-TableTransformPrecoder ENUMERATED (gam256, gam64LowSE) OPTIONAL, -- Need S
    uci-OnPUSCH SetupRelease ( CG-UCI-OnPUSCH ) OPTIONAL, -- Need M
    resourceAllocation ENUMERATED ( resourceAllocationType0, resourceAllocationType1, dynamicSwitch ),
    rbg-Size ENUMERATED (config2) OPTIONAL, -- Need S
    powerControlLoopToUse ENUMERATED (n0, n1),
    p0-PUSCH-Alpha P0-PUSCH-AlphaSetId,
    transformPrecoder ENUMERATED (enabled, disabled) OPTIONAL, -- Need S
    nrofHARQ-Processes INTEGER (1..16),
    repK ENUMERATED (n1, n2, n4, n8),
    repK-RV ENUMERATED (s1-0231, s2-0303, s3-0000) OPTIONAL, -- Need R
    M1 INTEGER (0 .. (2^16-1))
    M2 INTEGER (0 .. (2^16-1))
    ---periodicity ENUMERATED {
       sym2, sym7, sym1x14, sym2x14, sym4x14, sym5x14, sym8x14, sym10x14, sym16x14, sym20x14,
       sym32x14, sym40x14, sym64x14, sym80x14, sym128x14, sym160x14, sym256x14, sym320x14, sym512x14,
       sym640x14, sym1024x14, sym1280x14, sym2560x14, sym5120x14,
       sym6, sym1x12, sym2x12, sym4x12, sym5x12, sym8x12, sym10x12, sym16x12, sym20x12, sym32x12,
       sym40x12, sym64x12, sym80x12, sym128x12, sym160x12, sym256x12, sym320x12, sym512x12, sym640x12,
       sym1280x12, sym2560x12
    },---
    configuredGrantTimer INTEGER (1..64) OPTIONAL, -- Need R
    rrc-ConfiguredUplinkGrant SEQUENCE {
        timeDomainOffset INTEGER (0..5119),
        timeDomainAllocation INTEGER (0..15),
        frequencyDomainAllocation BIT STRING (SIZE (18)),
        antennaPort INTEGER (0..31),
        dmrs-SeqInitialization INTEGER (0..1) OPTIONAL, -- Need R
        precodingAndNumberOfLayers INTEGER (0..63),
        srs-ResourceIndicator INTEGER (0..15) OPTIONAL, -- Need R
        mcsAndTBS INTEGER (0..31),
        frequencyHoppingOffset INTEGER (1.. maxNrofPhysicalResourceBlocks-1) OPTIONAL, -- Need R
        pathlossReferenceIndex INTEGER (0..maxNrofPUSCH-PathlossReferenceRSs-1),
        ...
    } OPTIONAL, -- Need R
    ...
}
```

In some other embodiments $M_1$ and $M_2$ may not be included in the RRC signaling for an UL CG configuration. As discussed above, $M_1$ and $M_2$ can be signaled in MAC CE to the UE. The CG activation DCI for a CG configuration can indicate when the first PUSCH transmission with the current activation DCI to be expected by the UE. In this case, $I_{shift}$ is associated with the slot index of the slot where the first PUSCH appears.

are supported on a Bandwidth Part (BWP) in a cell. Assuming UL CG configuration 1 is configured with $M_1$=25 and $M_2$=3, and $I_{shift}$=3 from a first activation DCI. Then, the gNB, sends a MAC CE with $I_{shift}$=5.

In some embodiments for the UL CG Type 1, M1, M2, $I_{shift}$ (or {$SFN_{start\ time}$ and $slot_{start\ time}$} or {$SFN_{start\ time}$ and $slot_{start\ time}$, symbolstarttime}) can be RRC configured for a given UL CG configuration as shown in the code below.

```
ConfiguredGrantConfig ::= SEQUENCE {
  frequencyHopping ENUMERATED (intraSlot, interSlot) OPTIONAL, -- Need S
  cg-DMRS-Configuration DMRS-UplinkConfig.
  mcs-Table ENUMERATED (qam256, qam64LowSE) OPTIONAL, -- Need S
  msc-TableTransformPrecoder ENUMERATED (qam256, qam64LowSE) OPTIONAL, -- Need S
  uci-OnPUSCH SetupRelease ( CG-UCI-OnPUSCH ) OPTIONAL, -- Need M
  resourceAllocation ENUMERATED ( resourceAllocationType0, resourceAllocationType1, dynamicSwitch ),
  rbg-Size ENUMERATED (config2) OPTIONAL, -- Need S
  powerControlLoopToUse ENUMERATED (n0, n1),
  p0-PUSCH-Alpha P0-PUSCH-AlphaId,
  transformPrecoder ENUMERATED (enables, disabled) OPTIONAL, -- Need S
  nrofHARQ-Processes INTEGER(1..16),
  repK ENUMERATED (n1, n2, n3, n8),
  repK-RV ENUMERATED (s1-0231, s3-0303, s3-0000) OPTIONAL, -- Need F
      M1 (0 .. (2^16-1))
      M2 (0 .. (2^16-1))
        I_shift INTEGER (0..79)
```
$I_{shift}$ ~~periodicity ENUMERATED {~~
~~sym2, sym7, sym1x14, sym2x14, sym4x14, sym5x14, sym8x14, sym10x14, sym16x14, sym20x14,~~
~~sym32x14, sym40x14, sym64x14, sym80x14, sym128x14, sym160x14, sym256x14, sym320x14, sym512x14,~~
~~sym640x14, sym1024x14, sym1280x14, sym2560x14, sym5120x14,~~
~~sym6, sym1x12, sym2x12, sym4x12, sym5x12, sym8x12, sym10x12, sym16x12, sym20x12, sym32x12,~~
~~sym40x12, sym64x12, sym80x12, sym128x12, sym160x12, sym256x12, sym320x12, sym512x12, sym640x12,~~
~~sym1280x12, sym2560x12~~
~~},~~

```
  configuredGrantTimer INTEGER (1..64) OPTIONAL, -- Need R
  rrc-ConfiguredUplinkGrant SEQUENCE {
      timeDomainOffset INTEGER (0..5119),
      timeDomainAllocation INTEGER (0..15),
      frequencyDomainAllocation BIT STRING (SIZE(18)),
      antennaPort INTEGER (0..31),
      dmrs-SeqInitialization INTEGER (0..1) OPTIONAL, -- Need R
      precodingAndNumberOfLayers INTEGER (0..63),
      srs-ResourceIndicator INTEGER (0..1) OPTIONAL, -- Need R
      mcsAndTBSINTEGER (0..31),
      frequencyHoppingOffset INTEGER (1.. maxNrofPhysicalResourceBlocks-1) OPTIONAL, -- Need R
      pathlossReferenceIndex INTEGER (0..maxNrofPUSCH-PathlossReferencesRSs-1),
      ...
  } OPTIONAL, -- Need R
  ...
}
```

In some embodiments, M1, M2, I_shift (or {SFNstart time and slotstart time} or {SFNstart time and slotstart time, symbolstart time} are all Radio Resource Control (RRC) configured for a given UL CG configuration (Type 1) (see code below). Due to jitter or accumulated timing difference resulted from difference between the real traffic periodicity and $M_1/M_2$, the network may need to, once in a while, adjust $I_{shift}$. The gNB can send a DCI for a given UL CG configuration to adjust its $I_{shift}$. Note for Type 1, activation through DCI is not needed in the current NR design. Instead, a DCI based adjustment for $I_{shift}$ can be introduced. The UL CG configuration can be referred in the DCI. For example, there can be multiple active UL CG configurations. The DCI can refer to the CG configuration index so the UE can determine for which CG configuration the adjustment is intended.

```
ConfiguredGrantConfig ::= SEQUENCE {
    frequencyHopping ENUMERATED (intraSlot, interSlot) OPTIONAL, -- Need S
    cg-DMRS-Configuration DMRS-UplinkConfig,
    mcs-Table ENUMERATED (qam256, qam64LowSE) OPTIONAL, -- Need S
    mcs-TableTransformPrecoder ENUMERATED (qam256, qam64LowSE) OPTIONAL, -- Need S
    uci-OnPUSCH SetupRelease ( CG-UCI-OnPUSCH ) OPTIONAL, -- Need M
    resourceAllocation ENUMERATED ( resourceAllocationType0, resourceAllocationType1, dynamicSwitch ),
    rbg-Size ENUMERATED (config2) OPTIONAL, -- Need S
    powerControlLoopToUse ENUMERATED (n0, n1),
    p0-PUSCH-Alpha P0-PUSCH-AlphaSetId,
    transformPrecoder ENUMERATED (enabled, disabled) OPTIONAL, -- Need S
    nrofHARQ-Processes INTEGER(1..16),
    repK ENUMERATED (n1, n2, n4, n8),
    repK-RV ENUMERATED (s1-0231, s2-0303, s3-0000) OPTIONAL, -- Need R
        M1 (0 ... (2^16-1))
        M2 (0 ... (2^16-1))
        periodicity ENUMERATED (
            sym2, sym7, sym1x14, sym2x14, sym4x14, sym5x14, sym8x14, sym10x14, sym16x14, sym20x14,
            sym32x14, sym40x14, sym64x14, sym80x14, sym128x14, sym160x14, sym256x14, sym320x14, sym512x14,
            sym640x14, sym1024x14, sym1280x14, sym2560x14, sym5120x14,
            sym6, sym1x12, sym2x12, sym4x12, sym5x12, sym8x12, sym10x12, sym16x12, sym20x12, sym32x12,
            sym40x12, sym64x12, sym80x12, sym128x12, sym160x12, sym256x12, sym320x12, sym612x12, sym640x12,
            sym1280x12, sym2560x12
        },
```

```
    configuredGrantTimer INTEGER (1..64) OPTIONAL, -- Need R
    rrc-ConfiguredUplinkGrant SEQUENCE {
        I_shift INTEGER (0..79)
        timeDomainOffset INTEGER (0..5119),
        timeDomainAllocation INTEGER (0..15),
        frequencyDomainAllocation BIT STRING (SIZE(18)),
        antennaPort INTEGER (0..31),
        dmrs-SeqInitialization INTEGER (0..1) OPTIONAL, -- Need R
        precodingAndNumberOfLayers INTEGER (0..63),
        srs-ResourceIndicator INTEGER (0..15) OPTIONAL, -- Need R
        mcsAndTBS INTEGER (0..31),
        frequencyHoppingOffset INTEGER (1.. maxNrofPhysicalResourceBlocks-1) OPTIONAL, -- Need R
        pathlossReferenceIndex INTEGER (0..maxNrofPUSCH-PathlossReferenceRSs-1),
        ...
    } OPTIONAL, -- Need R
    ...
}
```

In some other embodiments, M1, M2, $I_{shift}$ ({$SFN_{start\ time}$ and $slot_{start\ time}$} or {$SFN_{start\ time}$ and $slot_{start\ time}$, $symbol_{start\ time}$}) are all RRC configured for a given UL CG configuration (Type 1) (see code below). Due to jitter or accumulated timing difference resulted from difference between the real traffic's periodicity and $M_1/M_2$, the network may need to adjust $I_{shift}$. The base station (e.g., gNB) can send a MAC CE for a given UL CG configuration to adjust $I_{shift}$. The MAC CE needs to refer to the CG configuration index so the UE can determine for which CG configuration the adjustment is intended.

Figure 8:
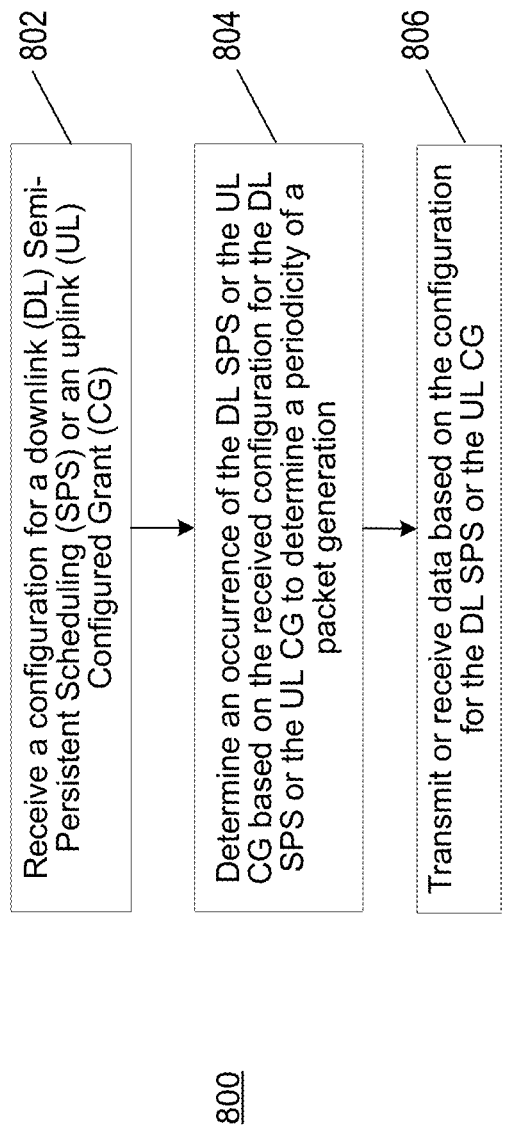
FIG. 8 is a flow chart illustrating a process of determining a periodicity at a UE based on a configuration of the DL SPS or the UL CG, according to some embodiments.

FIG. 8 illustrates a flow chart of some embodiments of a process 800 of determining a periodicity based on a configuration for the DL SPS or the UL CG at a UE. In some embodiments, a baseband processor of a wireless UE can be configured to perform operations. In operations 802, the baseband processor may receive a configuration for a downlink (DL) Semi-Persistent Scheduling (SPS) or an uplink (UL) Configured Grant (CG). The configuration may include an indication of non-integer periodicity of the DL SPS or the UL CG. Additionally, in operations 804, the baseband processor may determine an occurrence of the DL SPS or the UL CG based on the received configuration for

```
ConfiguredGrantConfig ::= SEQUENCE {
    frequencyHopping ENUMERATED (intraSlot, interSlot) OPTIONAL, -- Need S
    cg-DMRS-Configuration DMRS-UplinkConfig,
    mcs-Table ENUMERATED (qam256, qam64LowSE) OPTIONAL, -- Need S
    mcs-TableTransformPrecoder ENUMERATED (qam256, qam64LowSE) OPTIONAL, -- Need S
    uci-OnPUSCH SetupRelease ( CG-UCI-OnPUSCH ) OPTIONAL, -- Need M
    resourceAllocation ENUMERATED ( resourceAllocationType0, resourceAllocationType1, dynamicSwitch ),
    rbg-Size ENUMERATED (config2) OPTIONAL, -- Need S
    powerControlLoopToUse ENUMERATED (n0, n1),
    p0-PUSCH-Alpha P0-PUSCH-AlphaSetId,
    transformPrecoder ENUMERATED (enabled, disabled) OPTIONAL, -- Need S
    nrofHARQ-Processes INTEGER(1..16),
    repK ENUMERATED (n1, n2, n4, n8),
    repK-RV ENUMERATED (s1-0231, s2-0303, s3-0000) OPTIONAL, -- Need R
    M1 (0 ... (2^16-1))
    M2 (0 ... (2^16-1))
    periodicity ENUMERATED (
        sym2, sym7, sym1x14, sym2x14, sym4x14, sym5x14, sym8x14, sym10x14, sym16x14, sym20x14,
        sym32x14, sym40x14, sym64x14, sym80x14, sym128x14, sym160x14, sym256x14, sym320x14, sym512x14,
        sym640x14, sym1024x14, sym1280x14, sym2560x14, sym5120x14,
        sym6, sym1x12, sym2x12, sym4x12, sym5x12, sym8x12, sym10x12, sym16x12, sym20x12, sym32x12,
        sym40x12, sym64x12, sym80x12, sym128x12, sym160x12, sym256x12, sym320x12, sym612x12, sym640x12,
        sym1280x12, sym2560x12
    },
    configuredGrantTimer INTEGER (1..64) OPTIONAL, -- Need R
    rrc-ConfiguredUplinkGrant SEQUENCE {
        I_shift INTEGER (0..79)
        timeDomainOffset INTEGER (0..5119),
        timeDomainAllocation INTEGER (0..15),
        frequencyDomainAllocation BIT STRING (SIZE(18)),
        antennaPort INTEGER (0..31),
        dmrs-SeqInitialization INTEGER (0..1) OPTIONAL, -- Need R
        precodingAndNumberOfLayers INTEGER (0..63),
        srs-ResourceIndicator INTEGER (0..15) OPTIONAL, -- Need R
        mcsAndTBS INTEGER (0..31),
        frequencyHoppingOffset INTEGER (1.. maxNrofPhysicalResourceBlocks-1) OPTIONAL, -- Need R
        pathlossReferenceIndex INTEGER (0..maxNrofPUSCH-PathlossReferenceRSs-1),
        ...
    } OPTIONAL, -- Need R
    ...
}
``` the DL SPS or the UL CG to determine a periodicity of a packet generation. Further, in operations 806, the baseband processor may transmit or receive data based on the configuration for the DL SPS or the UL CG. When implemented, these embodiments of method and apparatus of device described herein can reduce UE power consumption and reduce PUCCH feedback for SPS HARQ.

In some embodiments, the indication of non-integer periodicity of the DL SPS or the UL CG further includes a first positive integer and a second positive integer indicating periodicity of the DL SPS and the UL CG. The operations to determine the occurrence of the DL SPS or the UL CG can include rounding a term comprising a ratio of the first positive integer and the second positive integer using a predefined rounding function. The predefined rounding function includes a round, a ceiling, or a floor operation.

In some embodiments, the indication of non-integer periodicity of the DL SPS or the UL CG can further include an indication to a frequency of the DL SPS or the UL CG. In these embodiments, for example, the signaling of non-integer periodicity can be in the form of a frequency (e.g., 30 Hz, 60 Hz, 120 Hz, etc.) In this manner, the indication of non-integer periodicity included in the configuration for the DL and UL CG can also include an indication to a frequency of the DL SPS or the UL CG. The configuration can further include an initial offset in slots or symbols. The initial offset in slots or symbols may be associated with a slot index of a slot or a symbol in which an initial DL SPS or UL CG appears.

In some embodiments, the occurrence of the DL SPS or the UL CG can be further determined based on a System Frame Number (SFN) of a first reception of a Physical Downlink Shared Channel (PDSCH) through DL SPS or a first transmission of Physical Uplink Shared Channel (PUSCH) through UL CG and a start time of a slot of the first reception of the PDSCH or the first transmission of the PDSCH. In some other embodiments, the occurrence of the DL SPS or the UL CG can be further determined based on a number of slots in a frame.

In some embodiments, the occurrence of the DL SPS or the UL CG can be further determined based on a number of symbols per slot and a start time of a symbol of the first reception of the PDSCH or the first transmission of the PUSCH. The occurrence of the DL SPS or the UL CG can be further determined based on a time reference of the SFN, and a time domain offset. The UL CG is a type 1.

In some embodiments, the occurrence of the DL SPS or the UL CG can be further determined based on a hyperframe index. The hyperframe index can be determined based on the first positive and second positive integers. The occurrence of the DL SPS or the UL CG can be further determined based on the number of symbols per slot.

In some embodiments, the operations to determine the occurrence of the DL SPS or the UL CG can further include receiving a jitter window parameter defining a jitter window around a nominal traffic arrival time. A reception occasion can occur within the jitter window. The nominal traffic time can be determined based on a running index and the first and second positive integers.

In some embodiments, the reception occasion can be expanded on one side or both sides of the reception occasion to include symbols not considered by any of the reception occasion. The symbols may include gap symbols between reception occasions, trailing symbols, or preceding symbols for a reception occasion. A reference reception occasion can indicate a nominal reception occasion in which the nominal traffic arrival time appears. The jitter window can be determined based on the jitter window parameter and the reference reception occasion.

In some embodiments, the jitter window parameter can be received via a Downlink Control Information (DCI), a Medium Access Control (MAC) Control Element (CE), or an RRC signaling.

In some embodiments, the operations to determine the occurrence of the DL SPS or the UL CG can further include receiving data scheduled through DL SPS or transmitting data through UL CG in a window defined by the jitter window.

Figure 9:
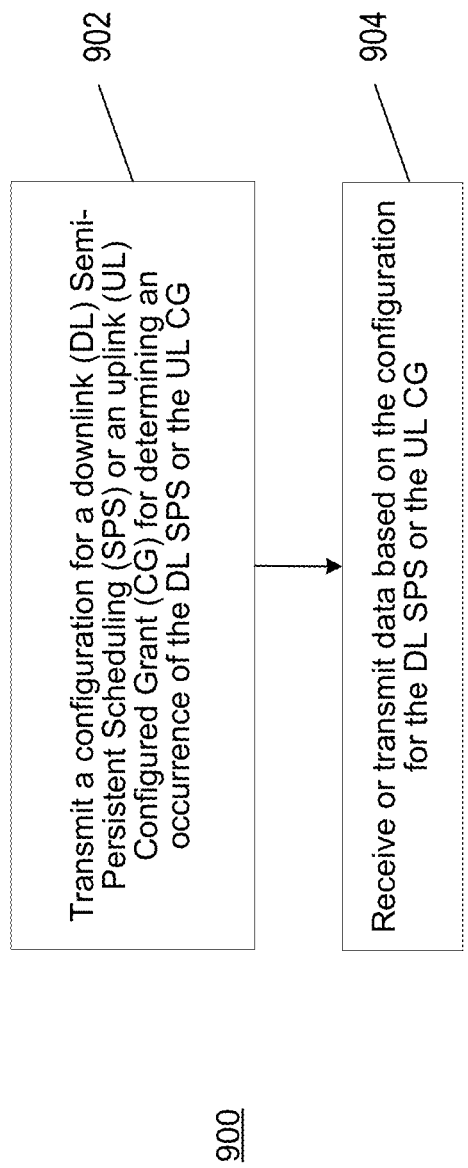
FIG. 9 is a flow chart illustrating a process of configuring a UE with DL SPS or UL CG at a BS, according to some embodiments.

FIG. 9 illustrates a flow chart of some embodiments of a process 900 of configuring a UE with a configuration for the DL SPS or the UL CG by a base station. A base station can include a processor configured to perform operations. In operations 902, the base station can transmit a configuration for a downlink (DL) Semi-Persistent Scheduling (SPS) or an uplink (UL) Configured Grant (CG) for determining an occurrence of the DL SPS or the UL CG. The configuration can include an indication of non-integer periodicity of the DL SPS or the UL CG. Thereafter, in operations 904, the base station can receive or transmit data based on the configuration for the DL SPS or the UL CG. When implemented, these embodiments of method and apparatus of device described herein can reduce UE power consumption and reduce PUCCH feedback for SPS HARQ.

In some embodiments, the indication of non-integer periodicity of the DL SPS or the UL CG further includes a first positive integer and a second positive integer indicating periodicity of the DL SPS and the UL CG. The operations to determine the occurrence of the DL SPS or the UL CG can include rounding a term comprising a ratio of the first positive integer and the second positive integer using a predefined rounding function. The predefined rounding function includes a round, a ceiling, or a floor operation.

In some embodiments, the indication of non-integer periodicity of the DL SPS or the UL CG can further include an indication to a frequency of the DL SPS or the UL CG. In these embodiments, for example, the signaling of non-integer periodicity can be in the form of a frequency (e.g., 30 Hz, 60 Hz, 120 Hz, etc.) In this manner, the indication of non-integer periodicity included in the configuration for the DL and UL CG can also include an indication to a frequency of the DL SPS or the UL CG. The configuration can further include an initial offset in slots or symbols. The initial offset in slots or symbols may be associated with a slot index of a slot or a symbol in which an initial DL SPS or UL CG appears.

In some embodiments, the occurrence of the DL SPS or the UL CG can be further determined based on a System Frame Number (SFN) of a first reception of a Physical Downlink Shared Channel (PDSCH) through DL SPS or a first transmission of Physical Uplink Shared Channel (PUSCH) through UL CG and a start time of a slot of the first reception of the PDSCH or the first transmission of the PDSCH. In some other embodiments, the occurrence of the DL SPS or the UL CG can be further determined based on a number of slots in a frame.

In some embodiments, the occurrence of the DL SPS or the UL CG can be further determined based on a number of symbols per slot and a start time of a symbol of the first reception of the PDSCH or the first transmission of the PUSCH. The occurrence of the DL SPS or the UL CG can be further determined based on a time reference of the SFN, and a time domain offset. The UL CG is a type 1.

In some embodiments, the occurrence of the DL SPS or the UL CG can be further determined based on a hyperframe index. The hyperframe index can be determined based on the first positive and second positive integers. The occurrence of the DL SPS or the UL CG can be further determined based on the number of symbols per slot.

In some embodiments, the operations to determine the occurrence of the DL SPS or the UL CG can further include transmitting a jitter window parameter defining a jitter window around a nominal traffic arrival time. A reception occasion can occur within the jitter window. The nominal traffic time can be determined based on a running index and the first and second positive integers.

In some embodiments, the reception occasion can be expanded on one side or both sides of the reception occasion to include symbols not considered by any of the reception occasion. The symbols may include gap symbols between reception occasions, trailing symbols, or preceding symbols for a reception occasion. A reference reception occasion can indicate a nominal reception occasion in which the nominal traffic arrival time appears. The jitter window can be determined based on the jitter window parameter and the reference reception occasion.

In some embodiments, the jitter window parameter can be transmitted via a Downlink Control Information (DCI), a Medium Access Control (MAC) Control Element (CE), or an RRC signaling.

In some embodiments, the operations to determine the occurrence of the DL SPS or the UL CG can further include transmitting data scheduled through DL SPS or receiving data through UL CG in a window defined by the jitter window.

Figure 10:
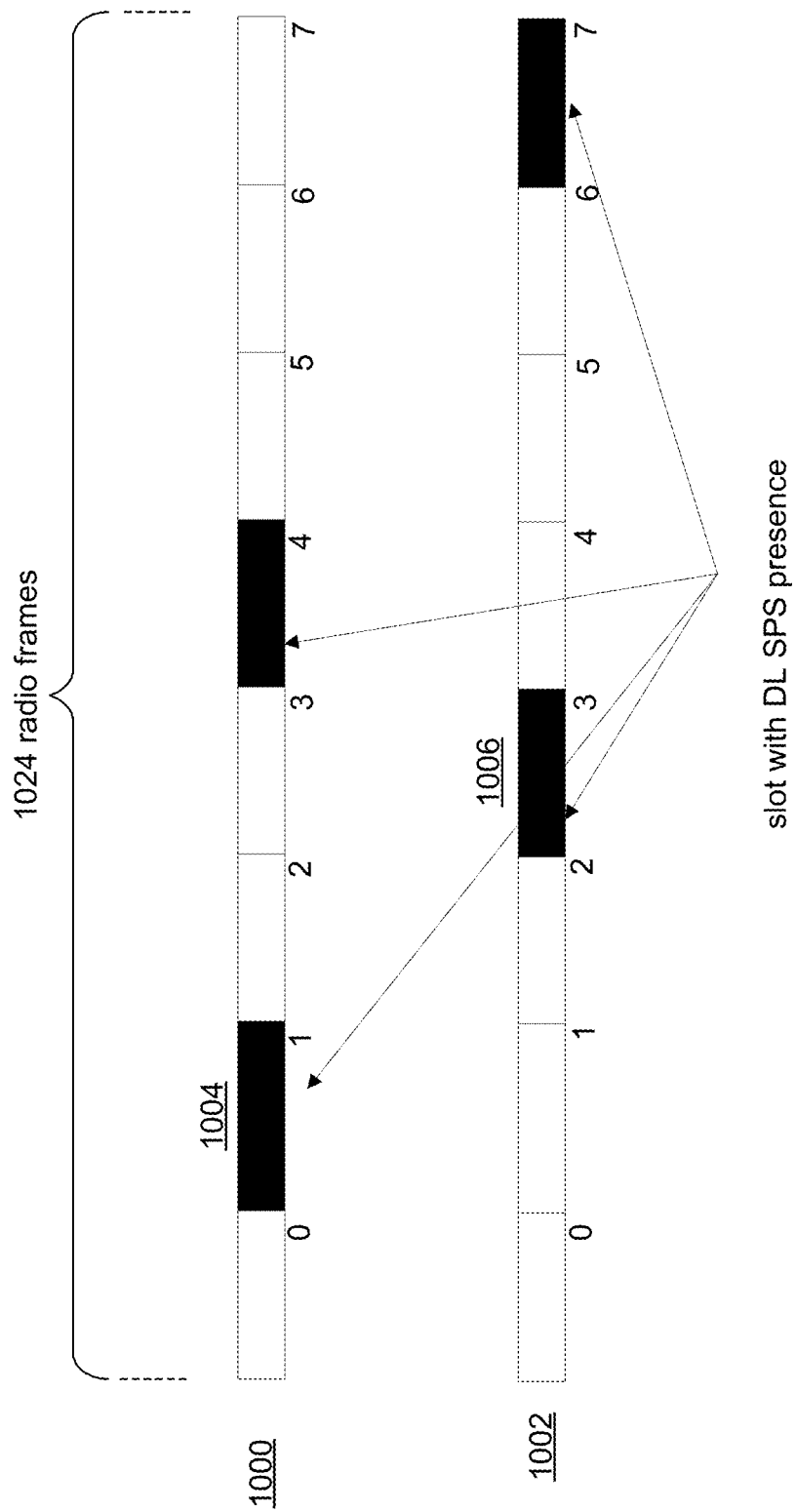
FIG. 10 is an illustration of some embodiments of a hyperframe with slots having the DL SPS, according to some embodiments.

FIG. 10 illustrates some embodiments of hyperframes 1000, 1002 with slots having the DL SPS (e.g., 1004). For example, the hyperframe 1000 may include 1024 radio frames. The hyperframe 1000 may be defined by radio frame 0 to radio frame 1023. As illustrated in FIG. 10, the hyperframes 1000, 1002 may include slots with DL SPS (e.g., 1004, 1006). As the IIoT/AR/VR traffic periodicity may not be an integer multiple of slots, the slot pattern with DL SPS may not repeat over segments of 1024 radio frames (or across hyper-frame boundaries). For example, with video stream at 60 frame per second, slot indices within hyperframes are described below (in this particular example, the pattern repeats after 5 hyperframes). In the example below, slot indices in Hyperframe 5 repeat as in Hyperframe 0.

embodiments can be extended to describe the CG aspect. The parameters can include an initial offset in symbols: $I_{shift}$, two integers to support the periodicity of traffic (e.g., $M_1$ and $M_2$), round operation: "round", "ceil" (round up to the smallest integer), "floor" (round down to the largest integer), which decides which function among r(x), c(x) or f(x) to use in the calculation below.

In some embodiments, the UE expects SPS transmission from the network from symbol mod(h(k),14) at slot mod(g(k), $N_{slot}^{subframe,\mu}$) within a subframe where the index of the subframe in a radio frame is given by mod($\lfloor g(k)/N_{slot}^{subframe,\mu} \rfloor$, $N_{subframe}^{frame,\mu}$), where the index of the radio frame in a hyperframe is given by mod($\lfloor g(k)/N_{slot}^{frame,\mu} \rfloor$, $N_{frame}^{hyperframe,\mu}$) where g(k)=$\lfloor$h(k)/14$\rfloor$, h(k)=f($M_1/M_2 \times k$)+$I_{shift}$, and where k is a running index.

At numerology given by µ (µ=0 for 15 KHz subcarrier spacing, µ=1 for 30 KHz subcarrier spacing, µ=2 for 60 KHz subcarrier spacing, µ=3 for 120 KHz subcarrier spacing), $N_{slot}^{subframe,\mu}$ is the number of slots in a subframe (1 slot/subframe for µ=0, 2 slots/subframe for µ=1, 4 slots/subframe for µ=2, 8 slots/subframe for µ=3), $N_{slot}^{frame,\mu}$ is the number of slots in a radio frame (note $N_{slot}^{frame,\mu} = N_{subframe}^{frame,\mu} \times N_{slot}^{subframe,\mu}$), $N_{subframe}^{frame,\mu}$ frame is the number of subframes in a frame (10 in the current NR design for µ=0, 1, 2, 3), and $N_{frame}^{hyperframe,\mu}$ is the number of frames in a hyperframe. It can be assumed that $N_{frame}^{hyperframe,\mu}$ equals to 1024. In some embodiments, it can be assumed there are 14 symbols in a slot. Configuration for the SPS can be performed via RRC signaling or MAC CE.

Figure 11:
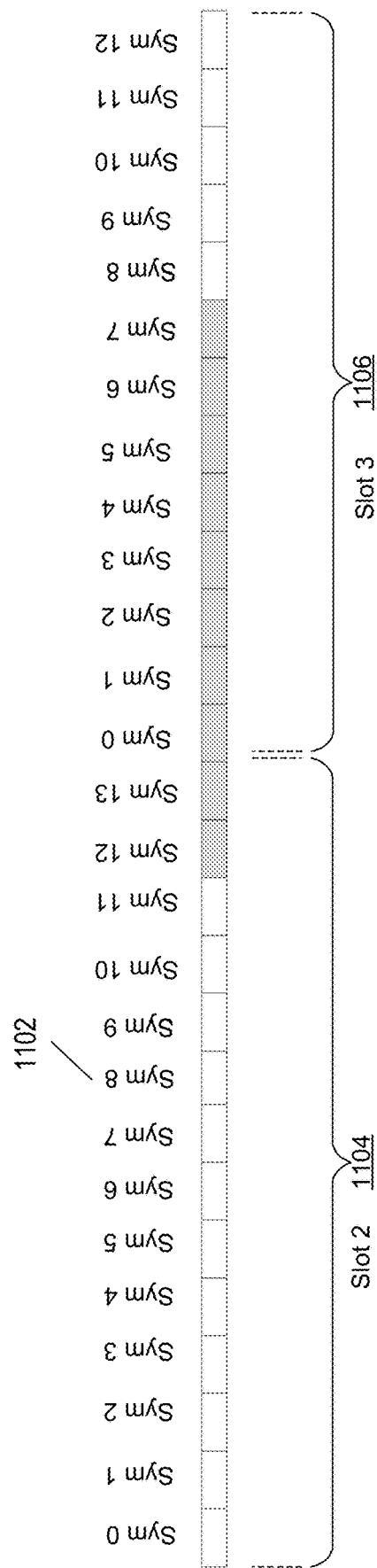
FIG. 11 is an illustration of some embodiments of a symbol level alignment, according to some embodiments.

FIG. 11 illustrates some embodiments of a symbol level alignment. For a UL CG Type 1 configuration, the PUSCH duration can be configured via timeDomainAllocation parameter. For example, 8 OFDM symbols can be intended for the PUSCH transmission. It may happen for some transmission occasion that the UL CG is to start on symbol 8 1102 (counting from 0) in a given slot m (e.g., slot 2 1104). Since there are 14 symbols in a slot, there are 6 symbols available in that slot m, and two additional OFDM symbols from slot (m+1) 1106 are needed for the UL CG transmission. If a nominal PUSCH transmission would cross a slot boundary, a number of solutions can be considered.

In some embodiments, if the UL CG configuration is with the so-called PUSCH repetition Type B, then no special handling is needed as PUSCH repetition type B can be used to segment a nominal PUSCH transmission into actual transmission(s). In some other embodiments, if the UL CG

| Hyperframe 0: | 0  | 17 | 34 | 50 | 67 | 84 | 100 | 117 | 134 | 150 | ... |
| --- | --- | --- | --- | --- | --- | --- | --- | --- | --- | --- | --- |
| Hyperframe 1: | 10 | 27 | 44 | 60 | 77 | 94 | 110 | 127 | 144 | 160 | ... |
| Hyperframe 2: | 4  | 20 | 37 | 54 | 70 | 87 | 104 | 120 | 137 | 154 | ... |
| Hyperframe 3: | 14 | 30 | 47 | 64 | 80 | 97 | 114 | 130 | 147 | 164 | ... |
| Hyperframe 4: | 7  | 24 | 40 | 57 | 74 | 90 | 107 | 124 | 140 | 157 | ... |
| Hyperframe 5: | 0  | 17 | 34 | 50 | 67 | 84 | 100 | 117 | 134 | 150 | ... |

In the previous design considerations, the DL SPS or the UL CG with non-integer periodicity with the current NR design are considered. The transmission occasions or reception occasions can be defined at slot level. For IIoT, the transmission occasions or reception occasions may need to be defined at symbol level, for example, to support a 1200 Hz packet generation for IIoT with a 15 KHz sub-carrier spacing.

For the SPS (or the CG), the periodicity of the SPS (periodicity of the CG) can be configured by some or all of the parameters below. For simplicity purposes, the embodiments described herein are directed towards the SPS. These configuration is not with PUSCH repetition type B, then the PUSCH transmission can be truncated.

In some embodiments, only the OFDM symbols in the first slot which overlaps with the nominal PUSCH can be used for transmission. In the example as illustrated in FIG. 11, only 6 symbols in slot m 1104 are used. In some other embodiments, only the slot with the most overlapping OFDM symbols with the nominal transmission is allowed for the transmission. In the example as illustrated in FIG. 11, slot 3 1106 is chosen, and PUSCH is constrained within slot 3 1106 (over symbols 0-symbol 7). In some other embodiments, the transmission (assuming that the PUSCH transmission does not accept more than 14 OFDM symbols) can be deferred to the next slot.

Still using the example as referenced in FIG. 11, the PUSCH transmission from symbol 0 of slot 3 and finishes on symbol 9 to satisfy the requirement of using 8 OFDM symbols for PUSCH transmission.

Figure 12A:
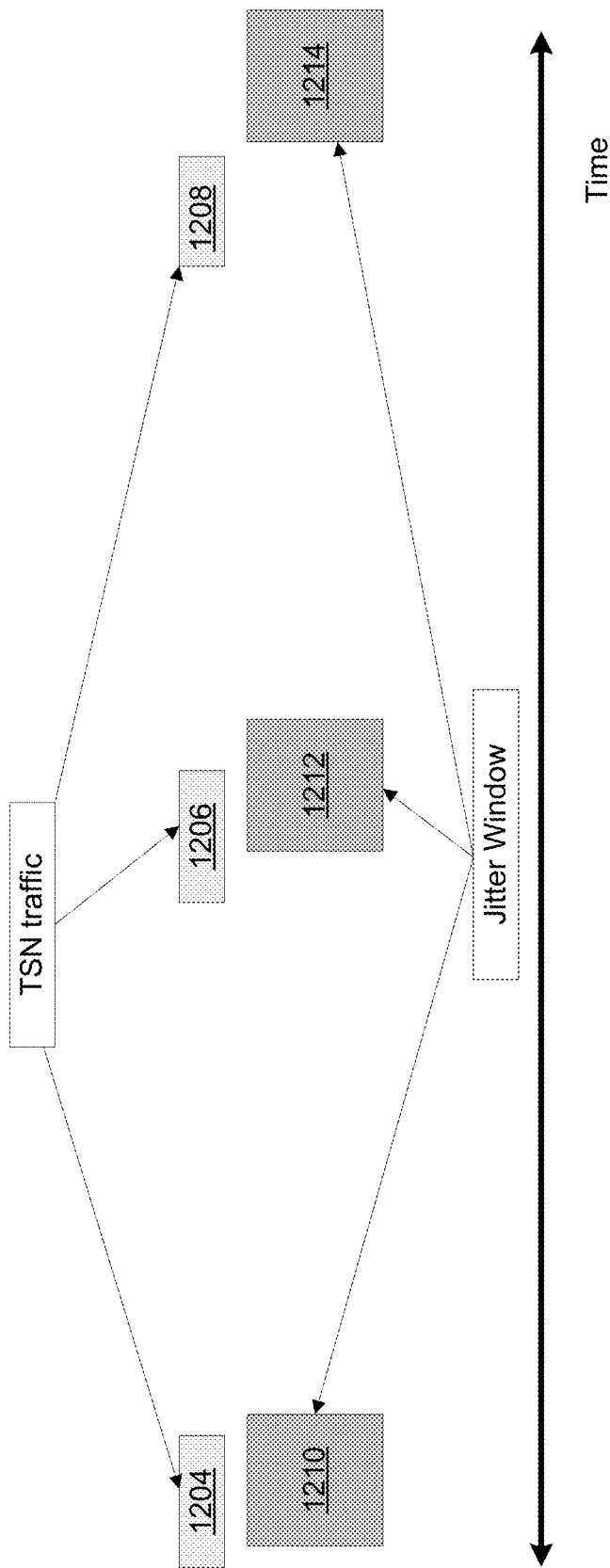
FIG. 12A is an illustration of some embodiments of a jitter window concept, according to some embodiments.

FIG. 12A illustrates embodiments of jitter window concept. Since 16 bits can be used for an RNTI configuration, it can be assumed that $M_1$ and $M_2$ can take up to 16 bits also. Referring to FIG. 12A, if the TSN traffic periodicity is so "odd", even with $M_1$ and $M_2$ from all possible combinations from 1 to 2^-16-1, there still be a slight difference between $M_1/M_2$ and the TSN traffic periodicity 1204-1208. As a

```
ConfiguredGrantConfig ::= SEQUENCE {
    frequencyHopping ENUMERATED (intraSlot, interSlot) OPTIONAL, -- Need S
    cg-DMRS-Configuration DMRS-UplinkConfig,
    mcs-Table ENUMERATED (qam256, qam64LowSE) OPTIONAL, -- Need S
    mcs-TableTransformPrecoder ENUMERATED (qam256, qam64LowSE) OPTIONAL, -- Need S
    uci-OnPUSCH SetupRelease ( CG-UCI-OnPUSCH ) OPTIONAL, -- Need M
    resourceAllocation ENUMERATED ( resourceAllocationType0, resourceAllocationType1, dynamicSwitch ),
    rbg-Size ENUMERATED (config2) OPTIONAL, -- Need S
    powerControlLoopToUse ENUMERATED (n0, n1),
    p0-PUSCH-Alpha P0-PUSCH-AlphaSetId,
    transformPrecoder ENUMERATED [enabled, disabled] OPTIONAL, -- Need S
    nrofHARQ-Processes INTEGER(1..16),
    repK ENUMERATED (n1, n2, n4, n8),
    repK-RV ENUMERATED (s1-0231, s2-0303, s3-0000) OPTIONAL, -- Need R
        M1 INTEGER (0 .. (2^16-1))
        M2 INTEGER (0 .. (2^16-1))
    configuredGrantTimer INTEGER (1..64) OPTIONAL, -- Need R
    rrc-ConfiguredUplinkGrant SEQUENCE {
        I_shift INTEGER (0..79)
        timeDomainAllocation INTEGER (0..15),
        frequencyDomainAllocation BIT STRING (SIZE(18)),
        antennaPort INTEGER (0..31),
        dmrs-SeqInitialization INTEGER (0..1) OPTIONAL, -- Need R
        precodingAndNumberOfLayers INTEGER (0..63),
        srs-ResourceIndicator INTEGER (0..15) OPTIONAL, -- Need R
        mcsAndTBS INTEGER (0..31),
        frequencyHoppingOffset INTEGER (1.. maxNrofPhysicalResourceBlocks-1) OPTIONAL, -- Need R
        pathlossReferenceIndex INTEGER (0..maxNrofPUSCH-PathlossReferenceRSs-1),
        ...
    } OPTIONAL, -- Need R
    ...
}
```

Considering potential jitter in the traffic arrival, the traffic arrival can be constrained to be within a jitter window around the nominal traffic generation time. For example, a jitter window $[g(k)-J_1, g(k)+J_2]$ can be defined where $J_1$ and $J_2$ are two parameters to set the jitter window (or "filter window"). Then, the network can configure $J_1$ and $J_2$ according to the jitter mechanism. For example $J_1=J_2$.

In some embodiments, $g'(k)=g(k)-J_1$ and $g''(k)=g(k)+J_2$ can be defined to define a window. The UE expects one SPS transmission from the network from the window defined by $g'(k)$ and $g''(k)$. In some other embodiments, the UE can expect one or more SPS transmissions from the network from the window defined by $g'(k)$ and $g''(k)$. For video traffic, for reference frame (I-frame), the payload can be large, but for P-frame as temporal correlation is exploited, the payload can be relatively small. Hence, it is desirable for the gNB to have the flexibility to transmit one or more PDSCHs within the jitter window.

The configuration, adaptation of $J_1$ and $J_2$ can follow that for $I_{shift}$, $M_1$, $M_2$ as discussed above. For example, gNB may adjust $J_1$ and $J_2$ with an activation DCI and/or MAC CE according to the expected video frame size's variation. The "jitter window" or "filter window" (through $J_1$ and $J_2$) can be considered for each DL SPS configuration, each UL CG configuration separately or jointly.

result, as the running index k increases, there will be increasingly a large offset between the TSN traffic 1204-1208 and the jitter window 1210-1214. The TSN packet arrival may be outside of the jitter window.

In this example, semi-static signaling and/or dynamic signaling can be used to adjust the reception window. With a dynamic signaling, $I_{shift}$ can be determined according to an activation DCI indicated in the receiver timing for the SPS. As for the CG, $I_{shift}$ can be determined according to an activation DCI indicated in the transmitter timing. In this example, $I_{shift}$ can be signaled using RRC signaling. For increased signaling robustness, MAC CE based solution can be also considered. For example, $I_{shift}$ can be carried in a MAC CE.

As discussed, over-provision and multiple SPS configuration solutions causes unnecessary UE power consumption because the UE does not know in advance how many SPS transmissions it should expect from frequency DL SPS occasions or multiple SPS occasions. Because the jitter window can be configured so that the occasions in which the UE needs to inspect potential DL SPS transmissions are significantly reduced, UE power consumption can be reduced. In addition, the HARQ feedback overhead can be reduced because there is a single DL SPS transmission within the jitter window.

With $J_1$ and $J_2$, the jitter window size is given by $J_1+J_2+1$. Since at most there is one transmission from the gNB in some embodiments, there can be two mutually exclusive cases for reception at a slot (detected a DL PS and successfully decoded it, detected a DL PS and failed to decode it) within the window defined by g'(k) and g"(k), so $2\times(J_1+J_2+1)$ code states are needed. Note such cases are also mutually exclusive across slots within the window. Further, if the UE fails to detect any transmission in any slot in the jitter window, then one additional code state can be included so the total number of code states for HARQ feedback is $2\times(U_1+J_2+1)+1$. Therefore $[\log_2 (2\times(J_1+J_2+1)+1)]$ bits are used. This compares favorably with the overhead with existing solutions. Note for existing solutions, the feedback overhead can be more than $J_1+J_2+1$ bits because the UE is not aware of the jitter window.

Jitter in packet arrival can be introduced by various nodes in a network connecting the application server to the UE client. A simplistic solution would be to configure frequent DL SPS reception to combat traffic jitter, however this solution may result in a very high UE power consumption. To minimize the occasions where the UE needs to detect SPS PDSCH, a jitter window around the nominal traffic arrival time can be introduced. As a result, the UE may expect a DL SPS transmission within the jitter window. Accordingly, the UE does not need to detect DL SPS PDSCH outside the jitter window. A nominal traffic arrival time can be represented by $t_1, t_2, t_3, \ldots$ in milliseconds. Then, the jitter window for a packet k can be represented by $[-j_1+t_k, j_2+t_k]$, where $t_k$ is given by $N\times M_1/M_2$. Reception occasions for a DL SPS PDSCHs can be defined within the jitter window $[-j_1+t_k, j_2+t_k]$.

For some traffic, DL SPS reception occasions in separate slots can be adequate. Therefore, identifying reception occasions from different slots included in the jitter window can be sufficient. For some other traffic including multiple reception occasions within a slot, an inter-reception occasion time, for example, $\Delta T$ is necessary, so the reception occasions within the jitter window can be determined using $-j_1+t_k \leq f \cdot \Delta T + t_k \leq j_2+t_k$. For example, with $j_1=\Delta T$, $j_2=2\cdot \Delta T$, f=0, −1, 1, 2 and 4 reception occasions can be identified.

Alternatively, multiple reception occasions within a slot can be supported by multiple starting symbols within a slot. Therefore, a number of starting symbols of reception occasions within a slot are signaled to the UE through RRC signaling and/or MAC CE. The reception occasions can be of the same duration or different durations. As for the case they are of the same duration, the duration can be derived from L which represents the number of OFDM symbols in PDSCH from the first PDSCH at activation. Note it is also possible to deduce the number of reception occasions in a slot from the starting symbol and duration of the first PDSCH, for example, the allowed starting symbols can be found from intersection of {0, 1, 2 . . . , 13} and {S, S+L, S−L, S+2×L, S−2×L, . . . } where S is the symbol index of the starting symbol in the first PDSCH. Gaps can be also created between two adjacent reception occasions with the starting symbols given by the intersection of {0, 1, 2 . . . , 13} and {S, S+L', S−L', S+2×L', S−2×L', . . . } where L'=L+number of OFDM symbols in a gap for normal Cyclic Prefix(CP), and by the intersection of {0, 1, 2 . . . , 11} and {S, S+L', S−L', S+2×L', S−2×L', . . . } where L'=L+number of OFDM symbols in a gap for extended CP.

A reception occasion can be expanded on one side or both sides of the reception occasion to include symbols not considered by any reception occasion. This will allow the derivation of the reception occasions within the jitter window more easily. The symbols not considered by any reception occasion may include gap symbols between reception occasions, trailing symbols, or preceding symbols for a reception occasion.

Figure 12B:
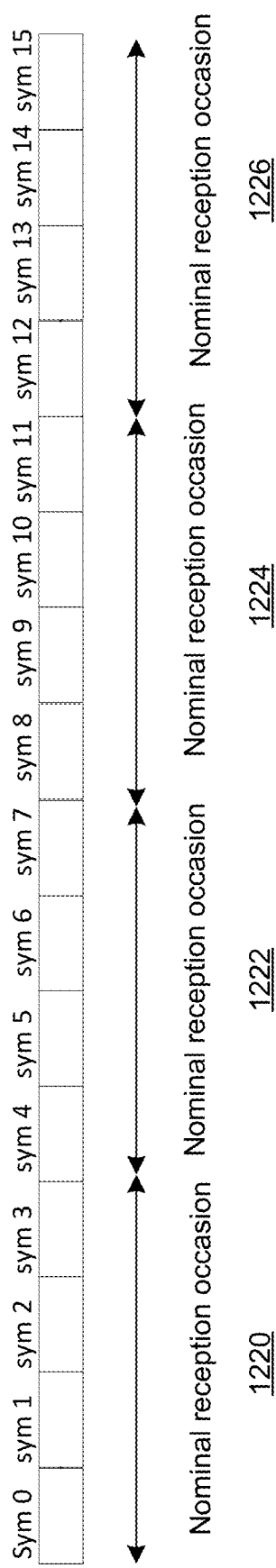
FIG. 12B is an illustration of some embodiments of nominal reception occasion concept based on a jitter window, according to some embodiments.

FIG. 12B illustrates an embodiment of a nominal reception occasion concept. In FIG. 12B, four reception occasions including four symbols are depicted, each including 3 OFDM symbols. The first reception occasion 1220 which includes symbol 1 to symbol 3, and Symbol 0 are combined to form a nominal reception occasion 1 1220. The fourth reception occasion including symbol 10 to symbol 12 and Symbol 13 are combined to form nominal reception occasion 4 1226. Based on the concept of the nominal reception occasion as discussed above, $t_k$ is tested to determine which nominal reception occasion in a slot the $t_k$ lands over. The determined nominal reception occasion can be designated as "reference reception occasion". The jitter window can be defined with $J_1$ reception occasions prior to the "reference reception occasion" and $J_2$ reception occasions after the reference reception occasion.

Figure 12C:
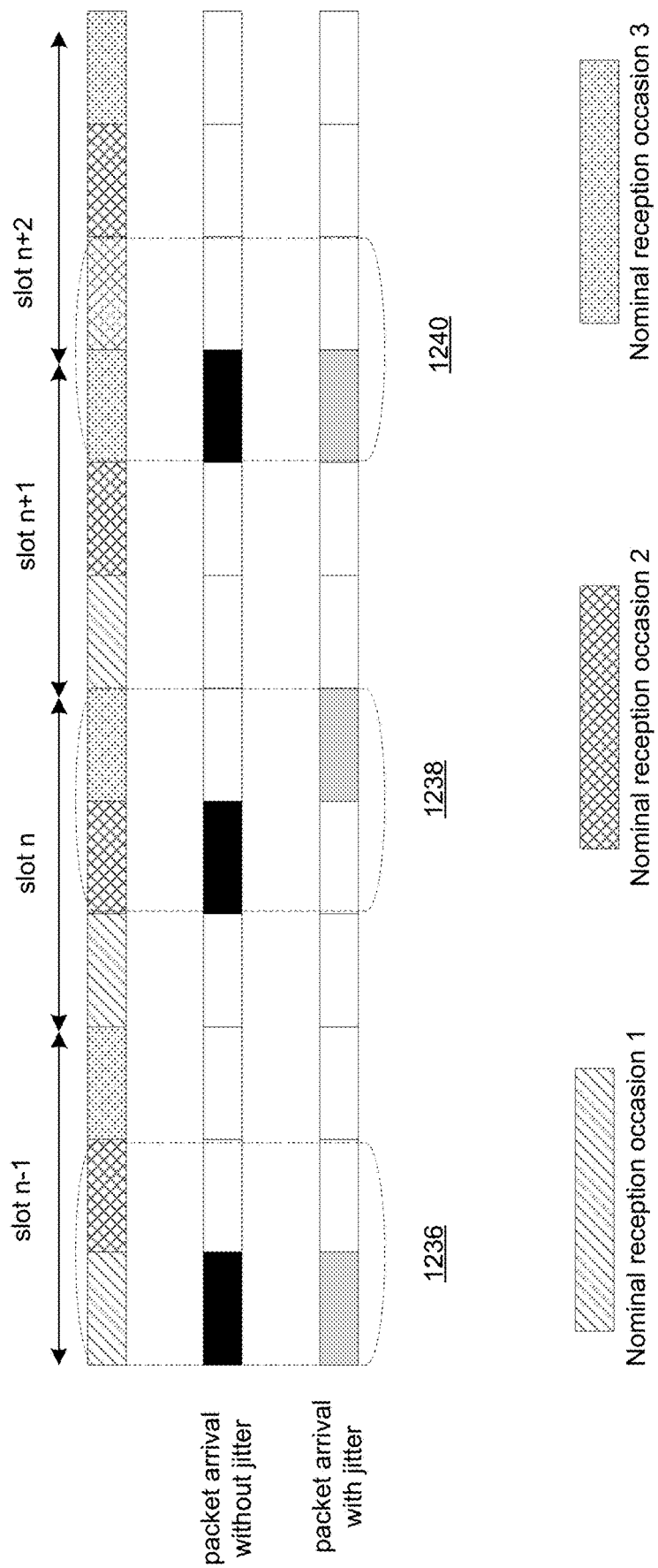
FIG. 12C is an illustration of some embodiments of a jitter window for packet arrival at 750 Hz with a SCS of 15 KHz, according to some embodiments.

FIG. 12C illustrates some embodiments of a jitter window for packet arrival at 750 Hz with a SCS of 15 KHz. In these embodiments, $J_1$ equals zero and $J_2$ equals one. As shown in FIG. 12C, three jitter windows 1236-1240 are depicted. Each of the three jitter windows covers two symbols.

Assuming there is a single reception occasion in a slot, when $M_1/M_2$ in milliseconds is used, the following change (marked in italic) is made to determine occasions where DL SPS grants occur.

After a downlink assignment is configured for an SPS, the MAC entity shall consider sequentially that downlink assignment(s) occurs between the slot for which: (numberOfSlotsPerFrame×1024×d+numberOfSlotsPerFrame× SFN+slot number in the frame)=[(numberOfSlotsPerFrame×SFN$_{start\ time}$+slot$_{start\ time}$)+ceil((−$j_1$+N×$M_1$/$M_2$)× numberOfSlotsPerFrame/10)] modulo (D×1024× numberOfSlotsPerFrame) and the slot for which: (numberOfSlotsPerFrame×1024×d+numberOfSlotsPerFrame×SFN+slot number in the frame)=[(numberOfSlotsPerFrame×SFN$_{start\ time}$+slot$_{start\ time}$)+ceil(($j_2$+N×$M_1$/$M_2$)× numberOfSlotsPerFrame/10)] modulo (D×1024× numberOfSlotsPerFrame) where SFN$_{start\ time}$ and slot$_{start\ time}$ are the SFN and slot, respectively, of the first transmission of PDSCH where the configured downlink assignment was (re-)initialized. In case of unaligned SFN across carriers in a cell group, the SFN of the concerned Serving Cell is used to calculate the occurrences of configured downlink assignments. d is zero at DL SPS (re-)initialization, and d is incremented by 1 for every 1024 radio frames. Note for the very first DL SPS PDSCH at activation, the jitter window is not applicable as it is not necessary on the UE to find when to expect the DL SPS PDSCH, as the very DL DPS PDSCH at activation is treated a DG (dynamic grant) for HARQ feedback point of view. Therefore, no special handling is needed.

In some embodiments, assuming a single transport block for each DL PDSCH (if two transport blocks are supported the design can be extended accordingly), one HARQ feedback bit is generated for each DL SPS PDSCH occasion within a jitter window. For Type 1 HARQ codebook design, the HARQ codebook is populated with HARQ feedback for DL SPS PDSCH within the jitter window. For SPS only HARQ codebook construction, in Rel-16 it was agreed that HARQ-ACK bit order for SPS PDSCH reception without a corresponding PDCCH is determined. In ascending order of DL slot per {SPS configuration index, serving cell index}, and then in ascending order of SPS configuration index per {serving cell index}, and then in ascending order of serving cell index.

Because DL SPS PDSCHs within the jitter window belong to a single SPS configuration, the same design principle from Release 16 can be applied. Note however there can be multiple DL SPS transmission occasions within a jitter window. Thus, their respective HARQ bits are included in the feedback for a given SPS configuration index.

Because Type 2 HARQ codebook design leverages the design for SPS only HARQ design, Type 2 HARQ codebook design for jitter window can be also supported. With the introduction of jitter window, if one or more DL SPS PDSCH are allowed within a jitter window as described above, the network can adapt the rate of data transmission with DL SPS at regular time epochs, e.g., at one epoch, the network needs to send to the UE with multiple DL SPS PDSCH carrying the reference frame or I-frame from a video encoder such as H.264 as the I-frame is of a large size, at another the network needs to send the UE with a single DL SPS PDSCH carrying P-frame or B-frame from video encoder such as H.264 as the P-frame/B-frame is of a small size. The jitter window design to allow rate adaptation of data transmission can be also used for UL CG, similar to DL SPS. In some other embodiments, at most a single DL SPS PDSCH can be expected within a jitter window. In these embodiments, efficient encoding scheme can be considered for SPS PDSCH only HARQ codebook design. For example, for a SPS configuration a jitter window $[-J_1, J_2]$ can be configured. In some embodiments, a single HARQ feedback bit can be generated for all reception occasions in the jitter window as a single DL SPS PDSCH is expected. The HARQ feedback time is according to the last reception occasion inside the jitter window (or reception occasion $J_2$ if the reference reception occasion is reception occasion 0). In some other embodiments, because there is at most one transmission from the gNB, for each of the $J_1+J_2+1$ reception occasions, two mutually exclusive cases for a reception at a reception occasion can be considered. For example, one case can include the UE detects the DL SPS and the UE successfully decodes the DL SPS. The other case can include the UE detects the DL SPS but the UE fails to decode it. Note such cases are also mutually exclusive across reception occasions within the jitter window. Further, if the UE fails to detect any transmission in any reception occasion in the jitter window, one additional code state can be included so the total number of code states for HARQ feedback is $2(J_1+J_2+1)+1$, which consumes $\lceil \log 2(2 \cdot (J_1+J_2+1)+1) \rceil$ bits.

In some embodiments, the fraction number to represent a periodicity can be applied to Frequency Division Duplex (FDD). For Time Division Duplex (TDD), the configured DL SPS transmission may collide with semi-static SFI UL symbol(s). In these embodiments, the DL SPS transmission may be deferred so the DL SPS transmission does not overlap with semi-static SFI UL symbol(s). Such a shift can be to towards an earlier slot or a later slot depending on the latency requirement. In some other embodiments, a solution similar to PUSCH repetition type B can be used for downlink and uplink (With PUSCH repetition Type B, segmentation of a nominal PUSCH can be used to handle situations such as cross slot boundary, colliding with UL symbol(s)).

Figure 13:
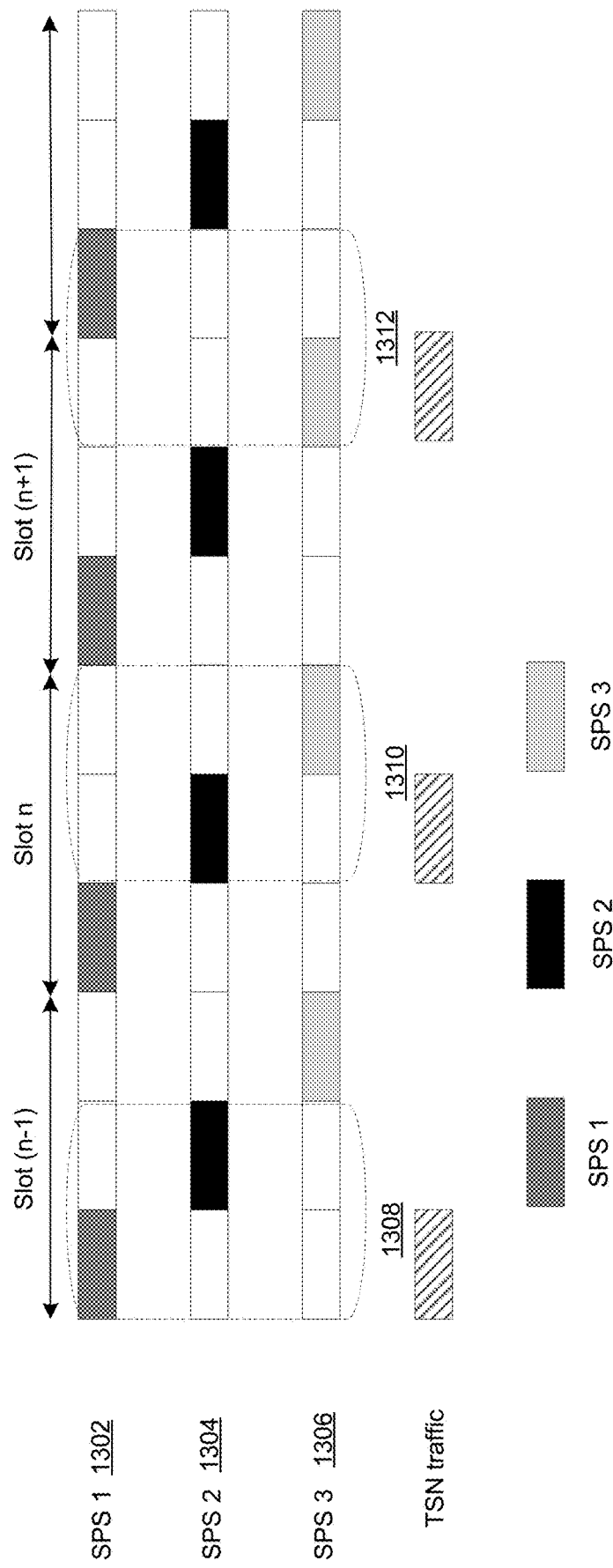
FIG. 13 is an illustration of some embodiments of reducing PDSCH detection load through jitter window for three DL SPS configurations, according to some embodiments.

FIG. 13 is an illustration of some embodiments of 3 DL SPS configurations (each with a periodicity of 1 millisecond) are configured for a UE following the Rel-16 NR design. For example, modifying the configuration of DL SPS/UL CG to support traffic with non-integer periodicity with the NR design can be considered. In one example shown in FIG. 13, 3 DL SPS (e.g., 1302-1306) configurations (each with a periodicity of 1 millisecond) are configured for a UE following the Rel-16 NR design. However, $I_{shift}$, $M_1$, $M_2$, $J_1$ and $J_2$ can be introduced to define the "filter window" or "jitter window" (e.g., 1308-1302). Only slots falling within the filter window or the jitter window 1308-1312 may contain SPS PDSCH for the current configuration.

The jitter window (e.g., 1308) can be used to limit the occasions where a UE needs to monitor DL SPS reception and generate HARQ feedback accordingly. For example, the jitter window can be used to filter out occasions where the UE does not expect DL SPS PDSCH. The jitter window can be also called a "filter window". The filter window can be configured per SPS configuration, or it can be configured jointly among multiple SPS configurations. In terms of signaling aspect, a number of options can be considered. In some embodiments, the signaling can be performed via a RRC configuration. In some other embodiments, MAC CE signaling can be also considered. For example, the MAC CE can include the SPS configuration indexes to indicate the filter window to a UE. In some other embodiments, dynamic signaling can also be used. For multiple SPS configurations that are linked to the same filtering window, one SPS configuration can be selected as the master SPS configuration. The filtering window configured with the master SPS configuration can be applied. The master SPS configuration can be selected via an SPS Configuration Index, for example, among linked SPS configurations. The one with the lowest SPS configuration Index can be selected as the master SPS configuration.

For example, SPS configurations with indexes {1, 3, 5} can be linked through RRC signaling for filtering window configuration. SPS 1 can be configured with a filtering window with $\{M_1, M_2, J_1, J_2\}$, and SPS 3 can be configured with a filtering window $\{M'_1, M'_2, J'_1, J'_2\}$. If all three SPS configurations are activated, the filtering window setup for SPS 1 can be applied (i.e. $\{M_1, M_2, J_1, J_2\}$). If only SPS 3 and SPS 5 are activated, then the filtering window setup for SPS 3 can be applied (i.e. $M'_1, M'_2, J'_1, J'_2$), $\{SFN_{start\ time}$ and $slot_{start\ time}\}$ or $\{SFN_{start\ time}$ and $slot_{start\ time}$, $symbol_{start\ time}\}$ can be determined according to the master SP configuration (e.g., the SPS configuration with the lowest index within a set of linked SPS configurations). In some embodiments, one set of configuration such as $\{M_1, M_2, J_1, J_2\}$ can be configured for multiple SPS configurations, $\{SFN_{start\ time}$ and $slot_{start\ time}\}$ or $\{SFN_{start\ time}$ and $slot_{start\ time}$, $symbol_{start\ time}\}$ can be determined according to the master SP configuration (e.g., the SPS configuration with the lowest index within a set of linked SPS configurations).

In some embodiments, the configuration of $\{M_1, M_2, J_1, J_2\}$ or $\{M_1, M_2\}$ applies to the jitter window, and a separate periodicity configuration is applied to DL SPS or UL CG. For a given DL SPS configuration, a UE is not required to receive DL SPS outside the intersection of jitter windows derived in part according to $\{M_1, M_2, J_1, J_2\}$ and DL SPS reception occasions derived in part according to the configured periodicity (e.g., 1 millisecond or 10 milliseconds). For a given DL SPS configuration, a UE is not allowed to transmit UL CG outside the intersection of jitter windows derived in part according to $\{M_1, M_2, J_1, J_2\}$ and CG transmission occasions derived in part according to the configured periodicity (e.g. 1 millisecond or 10 milliseconds). When one or multiple DL SPS configurations are linked to the same jitter window configuration, HARQ feedback overhead can be reduced as the UE generate HARQ feedback for DL SPS from a DL SPS configuration only for those DL SPS reception occasions within its associated jitter windows. If only one DL SPS reception or at most one DL SPS reception among all DL SPS receptions from all DL SPS configurations associated/linked with a jitter window configuration is expected, the HARQ feedback overhead can be further reduced.

In some other embodiments, the ratios of a first positive and second positive numbers $M_1/M_2$ (e.g., 25/3, 50/3, etc.) can be specified. Instead of two integers, a ratio or a reference to a ratio can be configured for a DL SPS configuration or a UL CG configuration.

In some other embodiments, the processes or methods depicted in the preceding figures may be performed by a baseband processor.

In some embodiments, the processes or methods depicted in the preceding figures may be performed by a user equipment (UE) including a processor.

In some other embodiments, the processes or methods depicted in the preceding figures may be performed by a base station (BS) processor.

Portions of what was described above may be implemented with logic circuitry such as a dedicated logic circuit or with a microcontroller or other form of processing core that executes program code instructions. Thus processes taught by the discussion above may be performed with program code such as machine-executable instructions that cause a machine that executes these instructions to perform certain functions. In this context, a "machine" may be a machine that converts intermediate form (or "abstract") instructions into processor specific instructions (e.g., an abstract execution environment such as a "virtual machine" (e.g., a Java Virtual Machine), an interpreter, a Common Language Runtime, a high-level language virtual machine, etc.), and/or, electronic circuitry disposed on a semiconductor chip (e.g., "logic circuitry" implemented with transistors) designed to execute instructions such as a general-purpose processor and/or a special-purpose processor. Processes taught by the discussion above may also be performed by (in the alternative to a machine or in combination with a machine) electronic circuitry designed to perform the processes (or a portion thereof) without the execution of program code.

The present invention also relates to an apparatus for performing the operations described herein. This apparatus may be specially constructed for the required purpose, or it may comprise a general-purpose computer selectively activated or reconfigured by a computer program stored in the computer. Such a computer program may be stored in a computer readable storage medium, such as, but is not limited to, any type of disk including floppy disks, optical disks, CD-ROMs, and magnetic-optical disks, read-only memories (ROMs), RAMs, EPROMs, EEPROMs, magnetic or optical cards, or any type of media suitable for storing electronic instructions, and each coupled to a computer system bus.

A machine readable medium includes any mechanism for storing or transmitting information in a form readable by a machine (e.g., a computer). For example, a machine readable medium includes read only memory ("ROM"); random access memory ("RAM"); magnetic disk storage media; optical storage media; flash memory devices; etc.

An article of manufacture may be used to store program code. An article of manufacture that stores program code may be embodied as, but is not limited to, one or more memories (e.g., one or more flash memories, random access memories (static, dynamic or other)), optical disks, CD-ROMs, DVD ROMs, EPROMs, EEPROMs, magnetic or optical cards or other type of machine-readable media suitable for storing electronic instructions. Program code may also be downloaded from a remote computer (e.g., a server) to a requesting computer (e.g., a client) by way of data signals embodied in a propagation medium (e.g., via a communication link (e.g., a network connection)).

The preceding detailed descriptions are presented in terms of algorithms and symbolic representations of operations on data bits within a computer memory. These algorithmic descriptions and representations are the tools used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be kept in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as "selecting," "determining," "receiving," "forming," "grouping," "aggregating," "generating," "removing," or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The processes and displays presented herein are not inherently related to any particular computer or other apparatus. Various general-purpose systems may be used with programs in accordance with the teachings herein, or it may prove convenient to construct a more specialized apparatus to perform the operations described. The required structure for a variety of these systems will be evident from the description below. In addition, the present invention is not described with reference to any particular programming language. It will be appreciated that a variety of programming languages may be used to implement the teachings of the invention as described herein.

It is well understood that the use of personally identifiable information should follow privacy policies and practices that are generally recognized as meeting or exceeding industry or governmental requirements for maintaining the privacy of users. In particular, personally identifiable information data should be managed and handled so as to minimize risks of unintentional or unauthorized access or use, and the nature of authorized use should be clearly indicated to users.

The foregoing discussion merely describes some exemplary embodiments of the present invention. One skilled in the art will readily recognize from such discussion, the accompanying drawings and the claims that various modifications can be made without departing from the spirit and scope of the invention.

What is claimed is:

1. A baseband processor of a wireless user equipment (UE) coupled to memory storing instructions that, when executed by the baseband processor, cause the UE to perform operations comprising:
receiving a configuration for a downlink (DL) Semi-Persistent Scheduling (SPS) or an uplink (UL) Configured Grant (CG), wherein the configuration comprises an indication of non-integer periodicity of the DL SPS or the UL CG wherein the indication of non-integer periodicity of the DL SPS or the UL CG comprises a first positive integer and a second positive integer;
determining an occurrence of the DL SPS or the UL CG based on a ratio of the first positive integer and the second positive integer to determine a periodicity of a packet generation, wherein determining the occurrence of the DL SPS or the UL CG comprises:
rounding a term comprising the ratio of the first positive integer and the second positive integer using a predefined rounding function, wherein the predefined rounding function comprises a round, a ceiling, or a floor operation, and
receiving a jitter window parameter defining a jitter window around a nominal traffic arrival time, wherein a reception occasion occurs within the jitter window, wherein the nominal traffic arrival time is determined based on a running index and first and second positive integers; and
transmitting or receiving data based on the occurrence of the DL SPS or the UL CG.

2. The baseband processor of claim 1, wherein the indication of non-integer periodicity of the DL SPS or the UL CG further comprises an indication to a frequency of the DL SPS or the UL CG.

3. The baseband processor of claim 1, wherein the configuration further comprises an initial offset in slots or symbols, the initial offset in slots or symbols being associated with a slot index of a slot or a symbol in which an initial DL SPS or UL CG appears.

4. The baseband processor of claim 1, wherein the occurrence of the DL SPS or the UL CG is further determined based on a System Frame Number (SFN) of a first reception of a Physical Downlink Shared Channel (PDSCH) through DL SPS or a first transmission of Physical Uplink Shared Channel (PUSCH) through UL CG and a start time of a slot of the first reception of the PDSCH or the first transmission of the PDSCH.

5. The baseband processor of claim 4, wherein the occurrence of the DL SPS or the UL CG is further determined based on a number of slots in a frame.

6. The baseband processor of claim 5, wherein the occurrence of the DL SPS or the UL CG is further determined based on a number of symbols per slot and a start time of a symbol of the first reception of the PDSCH or the first transmission of the PUSCH.

7. The baseband processor of claim 4, wherein the occurrence of the DL SPS or the UL CG is further determined based on a time reference of the SFN, and a time domain offset, wherein the UL CG is a type 1.

8. The baseband processor of claim 7, wherein the occurrence of the DL SPS or the UL CG is further determined based on a hyperframe index, wherein the hyperframe index is determined based on first positive and second positive integers.

9. The baseband processor of claim 8, wherein the occurrence of the DL SPS or the UL CG is further determined based on a number of symbols per slot.

10. The baseband processor of claim 1, wherein the reception occasion is expanded on one side or both sides of the reception occasion to include symbols not considered by any of the reception occasion, the symbols including gap symbols between reception occasions, trailing symbols, or preceding symbols for a reception occasion.

11. The baseband processor of claim 10, wherein a reference reception occasion indicates a nominal reception occasion in which the nominal traffic arrival time appears, wherein the jitter window is determined based on the jitter window parameter and the reference reception occasion.

12. The baseband processor of claim 1, wherein the jitter window parameter is received via a Downlink Control Information (DCI), a Medium Access Control (MAC) Control Element (CE) or an RRC signaling.

13. The baseband processor of claim 1, wherein determining the occurrence of the DL SPS or the UL CG further comprises:
receiving data scheduled through DL SPS or transmitting data through UL CG in a window defined by the jitter window.

14. A user equipment (UE) comprising:
an antenna;
a memory;
a RF circuitry commutatively coupled to the antenna; and
a processor coupled to memory storing instructions that, when executed by the processor, cause the UE to perform operations comprising:
receiving a configuration for a downlink (DL) Semi-Persistent Scheduling (SPS) or an uplink (UL) Configured Grant (CG), wherein the configuration comprises an indication of non-integer periodicity of the DL SPS or the UL CG,
determining an occurrence of the DL SPS or the UL CG based on the received configuration for the DL SPS or the UL CG to determine a periodicity of a packet generation, including receiving a jitter window parameter defining a jitter window around a nominal traffic arrival time, wherein a reception occasion occurs within the jitter window, wherein the nominal traffic arrival time is determined based on a running index and first and second positive integers, and
transmitting or receiving data based on the occurrence of the DL SPS or the UL CG.

15. A method, performed by a user equipment (UE), the method comprising:
receiving a configuration for a downlink (DL) Semi-Persistent Scheduling (SPS) or an uplink (UL) Configured Grant (CG), wherein the configuration comprises an indication of non-integer periodicity of the DL SPS or the UL CG wherein the indication of non-integer periodicity of the DL SPS or the UL CG comprises a first positive integer and a second positive integer;
determining an occurrence of the DL SPS or the UL CG based on a ratio of the first positive integer and the second positive integer to determine a periodicity of a packet generation, wherein determining the occurrence of the DL SPS or the UL CG comprises:
rounding a term comprising the ratio of the first positive integer and the second positive integer using a predefined rounding function, wherein the predefined rounding function comprises a round, a ceiling, or a floor operation, and
receiving a jitter window parameter defining a jitter window around a nominal traffic arrival time, wherein a reception occasion occurs within the jitter window, wherein the nominal traffic arrival time is determined based on a running index and first and second positive integers; and transmitting or receiving data based on the occurrence of the DL SPS or the UL CG.

* * * * *